United States Patent
Jones et al.

(10) Patent No.: US 10,652,034 B2
(45) Date of Patent: *May 12, 2020

(54) CONTROLLERS WITH INTEGRATED POWER OVER ETHERNET NETWORK SWITCHES

(71) Applicant: Honeywell International Inc., Morris Plains, NJ (US)

(72) Inventors: Lou Jones, Dayton, NV (US); Cory Grabinger, Maple Grove, MN (US); John Hutchey, North Las Vegas, NV (US); Paul Wacker, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/266,971

(22) Filed: Feb. 4, 2019

(65) Prior Publication Data

US 2019/0245706 A1    Aug. 8, 2019

Related U.S. Application Data

(63) Continuation of application No. 14/800,653, filed on Jul. 15, 2015, now Pat. No. 10,200,203.

(60) Provisional application No. 62/025,412, filed on Jul. 16, 2014.

(51) Int. Cl.
| | |
|---|---|
| *H04L 12/10* | (2006.01) |
| *H04L 12/40* | (2006.01) |
| *H04L 12/28* | (2006.01) |
| *H04L 12/24* | (2006.01) |

(52) U.S. Cl.
CPC ........ *H04L 12/10* (2013.01); *H04L 12/40045* (2013.01); *H04L 12/2803* (2013.01); *H04L 41/0654* (2013.01)

(58) Field of Classification Search
CPC . H04L 12/10; H04L 41/0654; H04L 12/2803; H04L 12/40045
See application file for complete search history.

(56) References Cited

U.S. PATENT DOCUMENTS

| | | | |
|---|---|---|---|
| 7,406,614 B2 | 7/2008 | Peleg et al. | |
| 8,164,436 B2 | 4/2012 | Baird, III et al. | |
| 8,855,832 B2 | 10/2014 | Rees | |
| 10,202,801 B2* | 2/2019 | Feldstein | E06B 9/68 |
| 2005/0245127 A1 | 11/2005 | Nordin et al. | |
| 2005/0264981 A1 | 12/2005 | Anderson et al. | |

(Continued)

*Primary Examiner* — Un C Cho
*Assistant Examiner* — Shah M Rahman
(74) *Attorney, Agent, or Firm* — Seager, Tufte & Wickhem LLP

(57) ABSTRACT

A system and approach that may provide power to network switches of controllers in a failsafe manner. For instance, when a controller is receiving normal power, the controller may act as a power over Ethernet (POE) source that supplies power to its connected Ethernet devices as required. However, if power to a controller is lost, then Ethernet devices may switch to a powered device mode and use power from a neighboring device to keep active. Some power may be tapped for network switch operation from any network switch port receiving power from another device. This may allow communication to remain operational across multiple devices in a string of which some have lost a source of normal power.

18 Claims, 26 Drawing Sheets

(56) References Cited

U.S. PATENT DOCUMENTS

| | | |
|---|---|---|
| 2007/0079151 A1 | 4/2007 | Connor et al. |
| 2007/0081549 A1 | 4/2007 | Cicchetti et al. |
| 2007/0081553 A1 | 4/2007 | Cicchetti et al. |
| 2007/0083668 A1 | 4/2007 | Kelsey et al. |
| 2007/0110081 A1 | 5/2007 | Miller |
| 2007/0233323 A1 | 10/2007 | Wiemeyer et al. |
| 2008/0028237 A1 | 1/2008 | Knight |
| 2010/0140365 A1 | 6/2010 | Kalore |
| 2010/0274927 A1 | 10/2010 | Bobrek |
| 2011/0112875 A1* | 5/2011 | Johnson ............... G06Q 10/063 705/7.11 |
| 2011/0196539 A1* | 8/2011 | Nair ................ G05B 19/41865 700/276 |
| 2012/0023340 A1 | 1/2012 | Cheung |
| 2012/0198246 A1 | 8/2012 | German et al. |
| 2013/0073874 A1 | 3/2013 | Eghbal |
| 2013/0131869 A1* | 5/2013 | Majewski .............. G05B 15/02 700/275 |
| 2013/0173937 A1 | 7/2013 | Lee |
| 2013/0201316 A1 | 8/2013 | Binder et al. |
| 2014/0031991 A1* | 1/2014 | Bergman ................. F24F 11/30 700/276 |
| 2014/0265550 A1 | 9/2014 | Milligan et al. |
| 2014/0277609 A1 | 9/2014 | Nye et al. |
| 2015/0362896 A1 | 12/2015 | Feldstein |

\* cited by examiner ered by reference. U.S. patent application Ser. No. 14/800,653, filed Jul. 15, 2015, is hereby incorporated by reference.

CONTROLLERS WITH INTEGRATED POWER OVER ETHERNET NETWORK SWITCHES

This application is a continuation of U.S. patent application Ser. No. 14/800,653, filed Jul. 15, 2015, and entitled "Controllers with Integrated Power over Ethernet Network Switches", now U.S. Pat. No. 10,200,203, which claims the benefit of U.S. Provisional Application No. 62/025,412, filed Jul. 16, 2014, and entitled "Controller with Integrated Power over Ethernet Power Switch". U.S. Provisional Application No. 62/025,412, filed Jul. 16, 2014, is hereby incorporated by reference. U.S. patent application Ser. No. 14/800,653, filed Jul. 15, 2015, is hereby incorporated by reference.

BACKGROUND

The present disclosure pertains to controllers and particularly to controllers having network switches.

SUMMARY

The disclosure reveals a system and approach that may provide power to network switches of controllers in a failsafe manner. For instance, when a controller is receiving normal power, the controller may act as a power over Ethernet (POE) source that supplies power to its connected Ethernet devices as required. However, if power to a controller is lost, then Ethernet devices may switch to a powered device mode and use power from a neighboring device to keep active. Some power may be tapped for network switch operation from any network switch port receiving power from another device. This may allow communication to remain operational across multiple devices in a string of which some have lost a source of normal power.

DESCRIPTION

Figure 1:
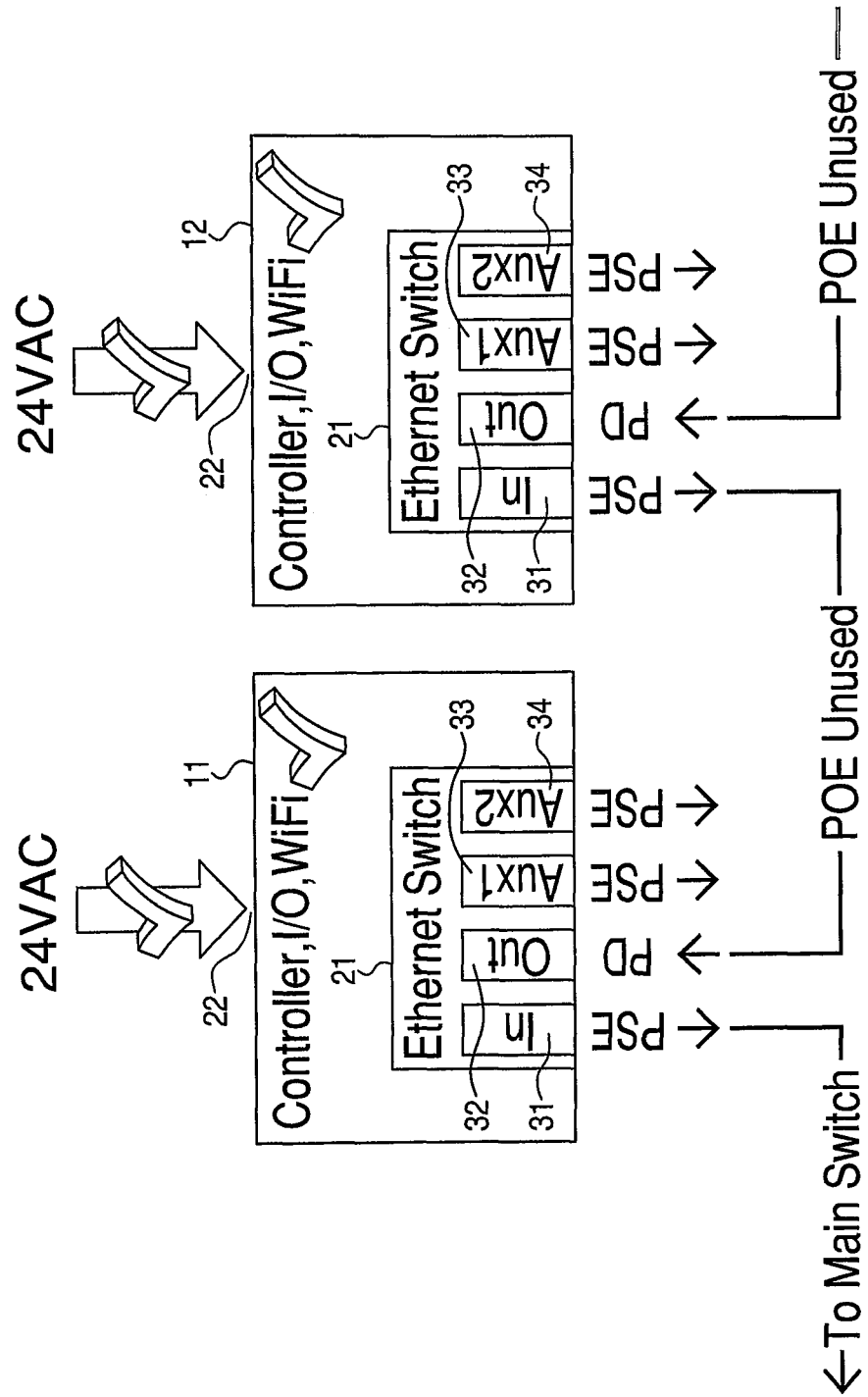
FIG. 1 is a diagram of example controllers having Ethernet switches.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Customer requirements may dictate the need for a high bandwidth connection among HVAC controllers. Available architectures may either need a home run connection between each controller and a central Ethernet switch location, or the use of an on-board Ethernet switch for daisy-chain connections. The installation material and labor cost to home run each device may make its implementation costly. The use of on-board switches as implemented in devices is not necessarily fault tolerant. If one device in a string of devices loses power, then communication may be lost to all downstream devices. Devices which include switches may have implemented the use of a spanning tree protocol as a limited measure of fault tolerance, but it does not necessarily address all situations and downstream controllers that may still experience a loss of communications when other devices lose power.

The present system may implement the Ethernet Power over Ethernet "IEEE 803.3a"t standard (POE) in a particular manner. When a controller is receiving normal AC power, it may act as a "POE Source" (i.e., source mode), supplying DC power to its connected Ethernet devices if required. However, if its AC power supply is lost, the device may switch to a "Powered Device" mode and may utilize DC power from neighboring devices to keep its Ethernet switch active.

While in "POE" source mode with normal AC power present, virtually all switch ports may operate in "POE source mode". While in "Powered Device" mode (in that normal AC power is not present), some power may be tapped for switch operation from any switch port receiving power from another device. Virtually all remaining power may be supplied to the unpowered switch ports in "POE Source" mode. This may allow communications to remain operational across multiple devices in a string which have lost AC power.

A controller with integrated network switch may be noted. Higher bandwidth networks for HVAC systems may be a way to address certain customer needs in the future. Higher bandwidth networks accompanied by low cost high million instructions per second (MIP) CPU's may have enabled many new features, capabilities, and applications in the next generation of HVAC controllers. IP Ethernet may be one of the top choices for increasing bandwidth in HVAC networks. Controller providers, spurred on by IT infrastructure providers, may be delivering Ethernet IP control solutions based on today's "home run" IP infrastructure topology. This solution may have created major issues with HVAC system implementation. Home running virtually all controllers and HVAC components may be more costly and time consuming. Also, from a new construction logistics perspective, the IT infrastructure may be the last piece to be installed, so it could force the construction process to be reordered or the HVAC integrators to wait until very late in the construction process. In some cases, this logistics issue is not necessarily able to be resolved. Depending on the context, IP may indicate internet protocol and IT may indicate information technology.

The present system may place the IT infrastructure directly in the HVAC controller. With this system, "Home running" communications may be no longer an issue and HVAC contractors may be able to daisy chain controllers. Construction logistics issues may also go away given that the HVAC contractor installs its own IP infrastructure with its controllers. The present system may deliver a high bandwidth network solution that allows HVAC contractors to remain in control of their systems and businesses, eliminates dependencies on the IT infrastructure and personnel, and reduces total install cost.

The present system may be made by integrating a multi-port IP switch (or some other network sharing device) directly into an HVAC controller or accessory.

POE questions may be noted. One is why may there be a need for IP at every device when there are already legacy bus types which provide a fault-tolerant daisy chain solution. Legacy bus types such as Lonworks™ or BACnet™ MSTP may run at very low speeds, such as 78 k BPS. Even the legacy "fast" Lonworks bus may be limited to 1.2M BPS but only for a reduced distance. The present IP architecture may be orders of magnitude faster than any legacy offering. It may provide at least 100M BPS using Fast Ethernet or 1000M BPS using Gigabit Ethernet.

The expanded bandwidth may allow capabilities that are unheard of. Users may be able to download their application in parallel to hundreds devices in the same amount of time that it takes to download a single device. Users may be able to collect history on nearly every point in the system, virtually all of the time, at almost any rate they choose. Users may be able to easily integrate other IP devices, such as, for example, plugging an IP video camera into the nearest present system VAV box.

Another question is whether installing Ethernet cabling to every device is possibly too expensive. Ethernet solutions may require virtually every device to be home run to a centrally located switch, and impose a maximum distance of about 328 feet between device and switch. This may require an increase in the quantity of wire, and a huge increase of labor to install the cable and cable trays, in addition to the cost of the switches themselves. To address these limitations, each present controller may include an integrated Ethernet switch. The switch may allow a daisy-chain installation, building the network as one goes. In addition, the ability to Star and T off the bus in multiple directions may be very beneficial in the total wire requirements.

Fault-tolerance concern may be a question. One does not necessarily want to lose communications to downstream devices if the present device has lost power. This may be a valid concern when using standard "off the shelf" switches. Some other IP devices which include integrated switches may implement multiple connection points in conjunction with the spanning tree protocol which provides some fault tolerance in limited circumstances. The present devices may provide superior fault tolerance versus spanning tree protocol by using multi-point POE (Power over Ethernet) injection instead.

A question may be what is POE and how could it help Ethernet devices to be daisy-chained. POE (Power over Ethernet IEEE 802.3) may be a standard which allows power to be sent over the IP network to power IP devices. Special POE switches or injectors may be used to supply power onto a single section of cable and a single device. An HVAC control manufacturer may market a VAV controller that is powered by POE, but this might be a costly design since every VAV device may need to be home run to the POE Switch.

Within an IP video approach, it may be possible to have Ethernet switches daisy-chained using a single POE source. Each switch in the daisy chain may be powered from the POE power of the network cable.

Another question may be how POE could be implemented in present devices. The present devices are not necessarily completely powered from POE possibly like some others' connections. Instead, the present system may use the POE power to power the network switch portion of the controller only. With some approaches, POE might only provide enough power for a single VAV controller and actuator, thus needing virtually every device to be home run. In addition, POE sourcing switches may be expensive, which might more than offset any "savings" provided by not running 24V power cable to the device.

The present devices may use an alternative approach to POE. Each present switch may be capable of being both a POE source (802.3 at Power Sourcing Equipment) and a POE consumer (802.3 at Powered Device). When normal AC power is available to a present device, the controller may operate normally, as well as run its switch as a POE source.

If AC power is lost, the present controller may shut down; however, its switch may convert to powered device mode, allowing it to remain operating by using power supplied by its neighbor. This may be an industry first approach, allowing a company of the approach to be a leader in providing an affordable, reliable HVAC IP backbone solution.

Some aspects of the present disclosure may involve several elements incorporating: 1) Back end IT infrastructure design using integration of JACE with consumer technologies, like WiFi routers, with some possible integration with field devices; 2) Middle ware concepts; and 3) A services layer—building multiple use cases on top of an architecture. The present system, incorporating one or more controllers and other components, may involve Niagara™, JACE™, Vykon™ and Tridium™, among other items.

A daisy-chained power on Ethernet (POE) controller may be noted. FIG. 1 is a diagram of example controllers 11 and 12. Each controller may incorporate a four-port Ethernet switch 21 plus WiFi. Each port may have a dedicated purpose as indicated by its label. "In" may be a POE power sourcing equipment (PSE) port 31. "Out" may be a POE powered device (PD) port 32. "Aux1" may be a POE power sourcing equipment port 33, typically used for a POE wall module. "Aux2" may be a POE power sourcing equipment port 34, typically used for a POE IP camera. WiFi (radio) may be for a wireless connection which can support client and access point modes (like that of Titan™). 24 VAC may be provided to each of controllers 11 and 12 at input 22.

Figure 2A:
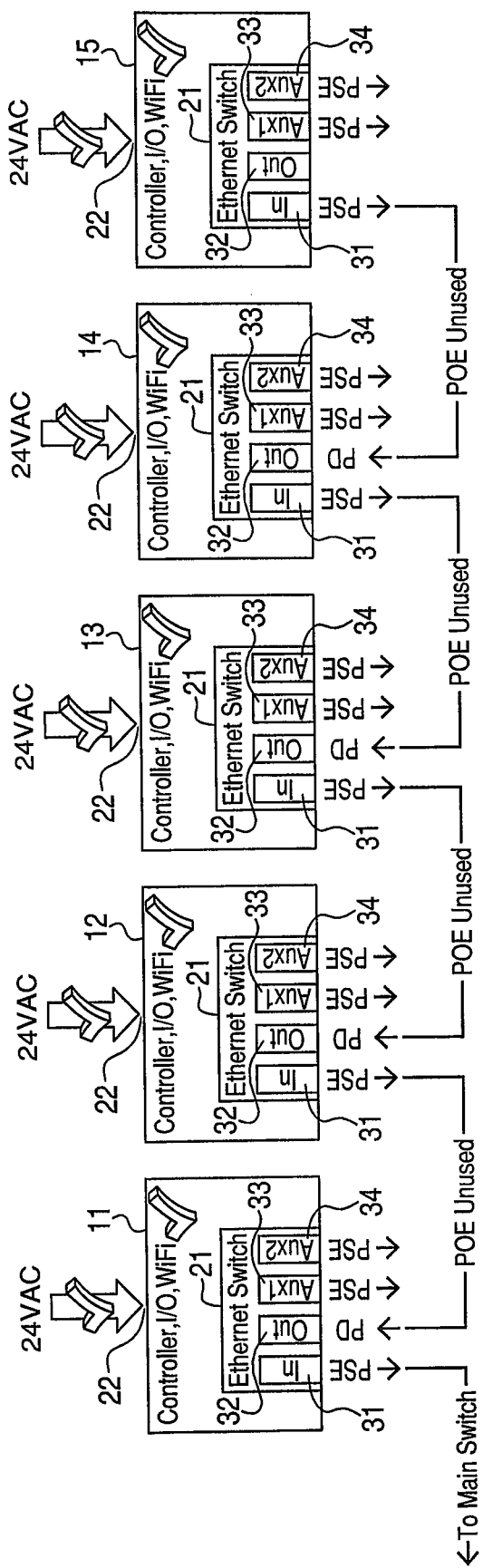
FIG. 2a is a diagram of a daisy chain of controllers having power over network cables not being used.

FIG. 2a is a diagram of a normal operating mode of a daisy-chained POE controller arrangement. Normal operating mode may imply that 24 VAC at inputs 22 is present at controllers 11-15. Each controller, I/O, network or Ethernet switch 21 and WiFi radio may be powered entirely from a 24 VAC input 22. No POE power is necessarily consumed from in port 31 of network switch 21 the controllers. A controller may act as a power sourcing equipment providing 15 watt power which can be also sourced from the 24 VAC at input 22. POE power may be made available on ports 31, 33 and 34 (listed in order of priority). Switch 21 of controller 11 may have port 31 connected to a main switch. Switch 21 of controller 12 may have port 31 connected to port 32 for switch 21 of controller 11 via a cable with unused POE. Switch 21 of controller 13 may have port 31 connected to port 32 for switch 21 of controller 12 via a cable with unused POE. Switch 21 of controller 14 may have port 31 connected to port 32 for switch 21 of controller 13, via a cable with unused POE. Switch 21 of controller 15 may have port 31 connected to port 32 of switch 21 for controller 14 via a cable with unused POE.

Figure 2B:
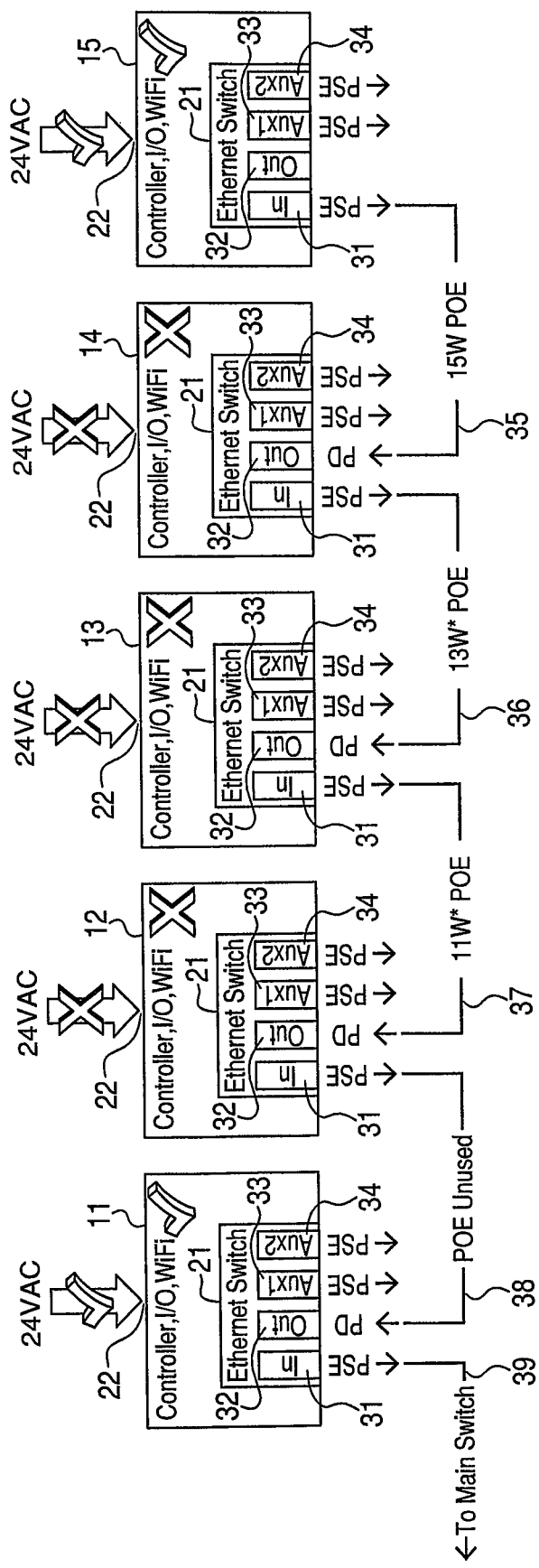
FIG. 2b is a diagram of a daisy chain of controllers having power over network cables being used.

FIG. 2b is a diagram of a daisy-chained POE controller arrangement having an input power failure mode, i.e., of one or more controllers not having 24 VAC present at input 22. Controllers 12, 13 and 14 do not necessarily have 24 VAC power at their power inputs 22. Remaining controllers 11 and 15 may have power at inputs 22. The out port 32 may act as a powered device (PD). A portion of power received from out port 32 may be used to power Ethernet switch 21. A two watt switch load may be assumed. The remaining power may be made available at an in port 31. No power will necessarily be available to the controller, I/O or WiFi radio. Aux 1 port 33 and Aux 2 port 34 will not necessarily be power sourcing equipment (PSE) power in an input power failure mode. In port 31 at switch 21 of controller 15 may have priority. No power will be available on Aux ports 33 and 34 if the in port 31 is fully loaded.

A cable 35 may provide 15 watts POE from in port 31 for switch 21 of controller 15, which has voltage to input 22, and to out port 32 for switch 21 of controller 14. A cable 36 may provide 13 watts POE from in port 31 for switch 21 of controller 14, which does not necessarily have voltage at input 22, to out port 32 for switch 21 of controller 13. A cable 37 may provide 11 watts POE from in port 31 for switch 21 of controller 13, which does not necessarily have voltage at input 22, to out port 32 of for switch 21 of controller 12. Cable 38 does not necessarily provide power from in port 31 for switch 21 of controller 12 to out port 32 for switch 21 of controller 11.

Cable 38 may connect in port 31 for switch 21 of controller 12 to out port 32 of controller 11. The POE of cable 38 may be unused and thus does not necessarily carry any power from controller 12 to controller 11. Controller 12 may have no voltage at input 22. However, controller 11 may have voltage at input 22 and thus not necessarily have power on POE cable 38 from in port 31 for switch 21 of controller 12 to out port 32 for switch 21 of controller 11. A reduction of power from out port 32 to in port 31 at controllers 14 and 13 may be regarded as due to the load of Ethernet switch 21. A cable 39 may connect in port 31 to a main switch. A main switch is not necessarily present in various arrangements of switches and controllers.

Figure 2C:
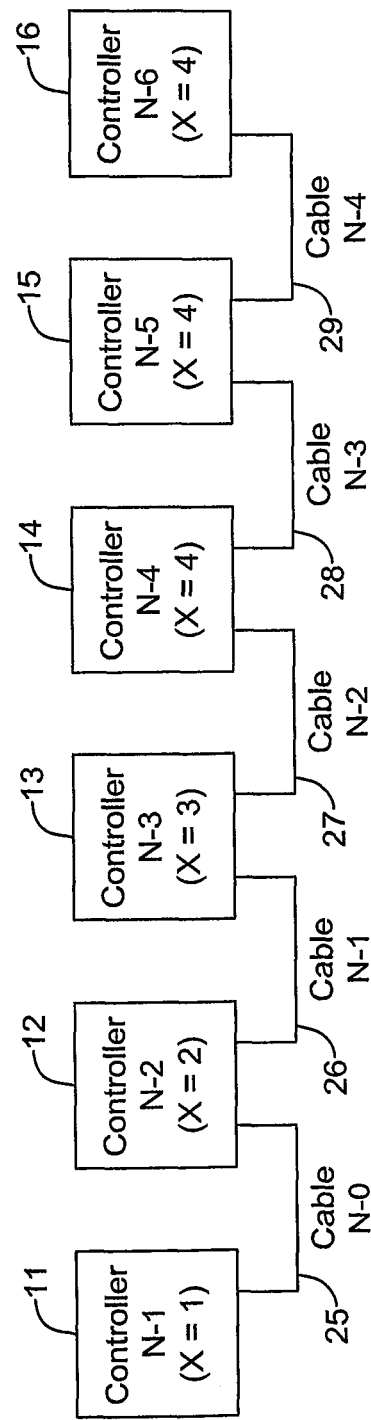
FIG. 2c is an exemplary diagram of a daisy chain of controllers having power over network cables.

An exemplary connection diagram is shown in FIG. 2c in which six daisy-chained controllers N-1 through N-6, identified by reference numerals 11-16, are connected by five cables N-0 through N-4, identified by reference numerals 25-29.

Figure 3:
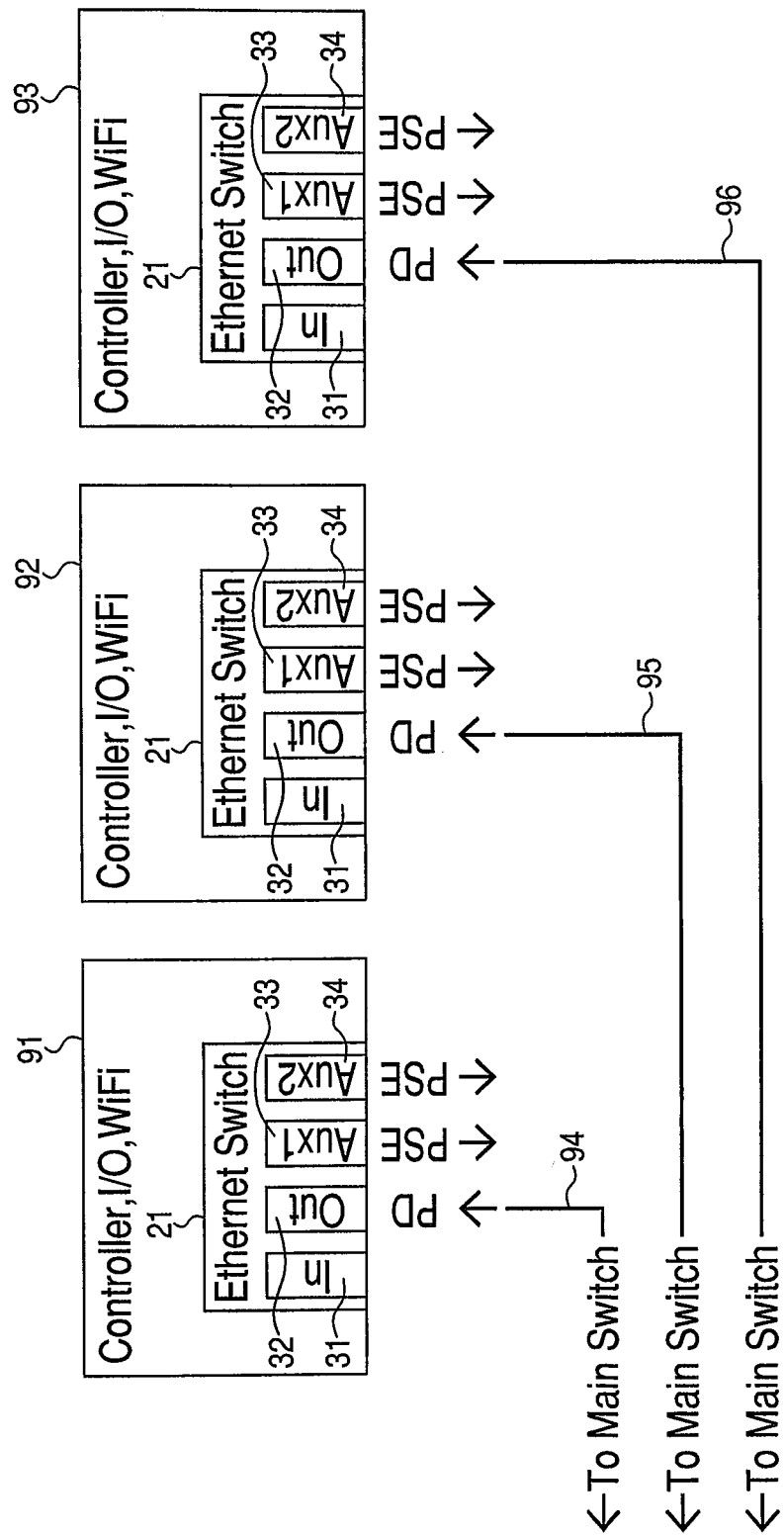
FIG. 3 is a diagram of a controller arrangement in a home run mode.

FIG. 3 is a diagram of a controller arrangement in a home run mode. The mode may be used for cooling only VAV (variable air volume) boxes having no 24 VAC peripherals. A hardware switch on a controller may select the home run mode. When the home run mode is selected, the 24 VAC will not necessarily be needed to power the device.

The controller arrangement in the diagram of FIG. 3, reveals controllers 91, 92 and 93 that are separate from one another. Each controller may have an Ethernet switch 21 with an in port 31, aux ports 33 and 34, and an out port 32. A cable 94 may connect out port 32 for switch 21 of controller 91 to a main switch. A cable 95 may connect out port 32 for switch 21 of controller 92 to a main switch. A cable 96 may connect out port 32 for switch 21 of controller 93 to a main switch.

Figure 4:
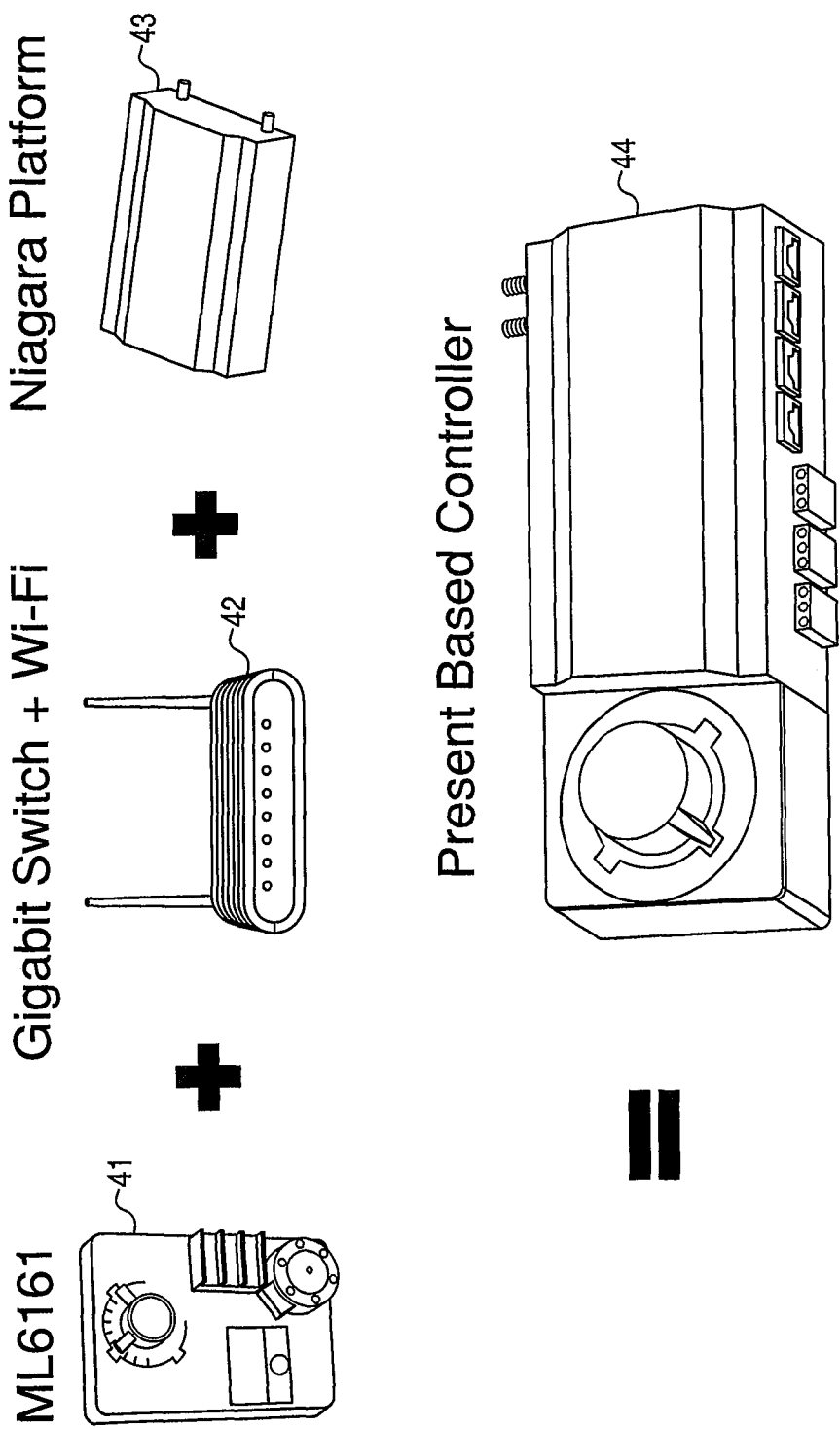
FIG. 4 is a diagram of reconfiguring hardware that may incorporate a sum of an actuator, a gigabit switch and a platform to equal a present based controller.

An approach may be to reconfigure hardware that may incorporate a sum of an actuator 41, a gigabit switch 42 and a Niagara platform 43 to equal a present based controller 44 of FIG. 4.

An idea is to capitalize on available hardware that may include expansion of a SOM module, Multivalent/Eagle, and Titan. The advantages may be fast to market by leveraging existing platforms, low cost hardware development and IP based hardware communication.

An available system may mean minimal software development. The system may run on available Niagara software versions, use a subset of existing Niagara modules, use standard Niagara components, be poised to take advantage of Niagara 4 but may run with any version of Niagara, and useful for Agile software approach for new features.

Figure 5:
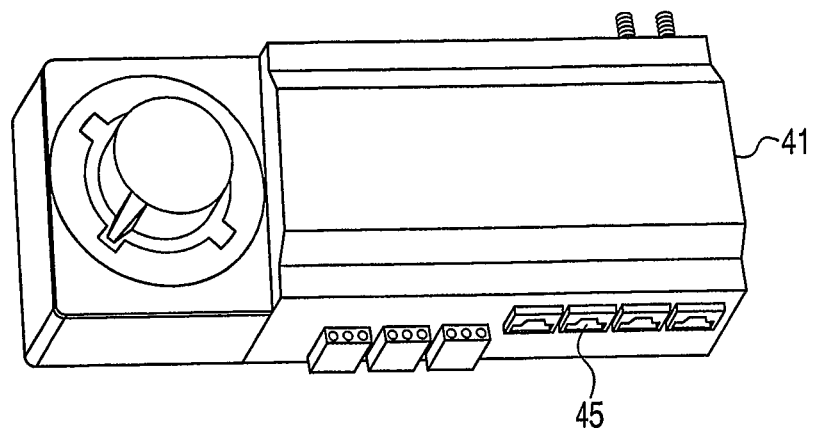
FIG. 5 is a diagram of an unmanaged network switch on a controller.

An available system integrated switch may incorporate an integrated unmanaged gigabit network switch 45, on virtually every device such as controller 44 of FIG. 5. With the system integrated switch, one may build an IP network as one goes creating one's own building local area network (BLAN).

Figure 6:
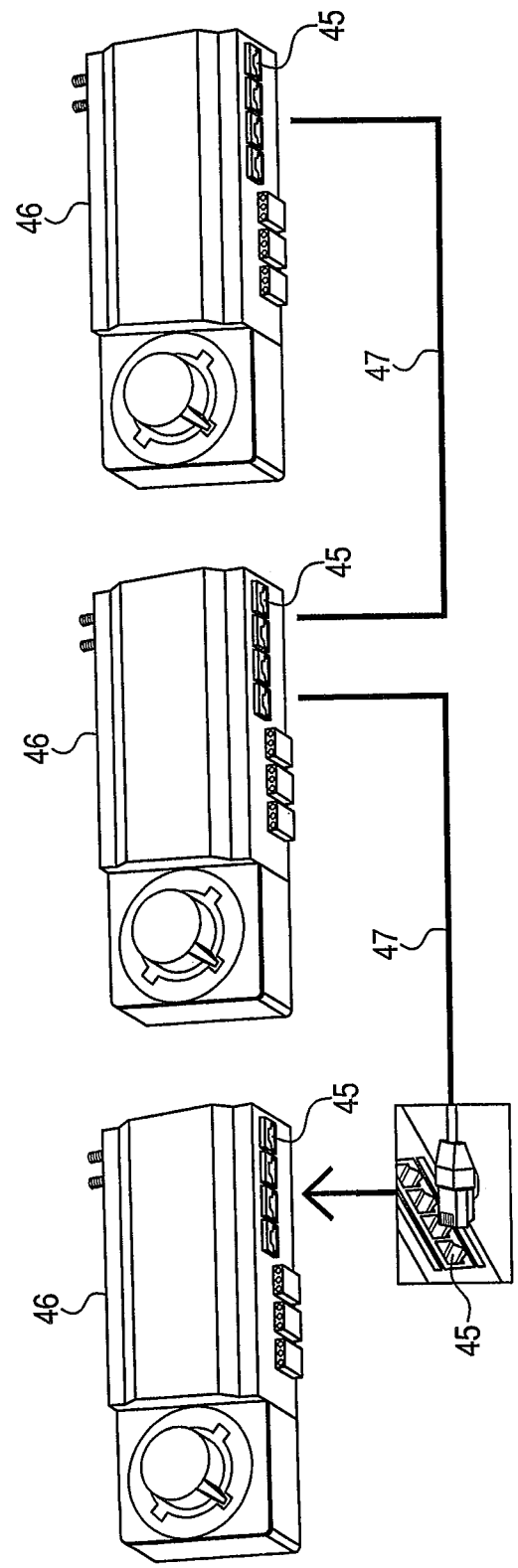
FIG. 6 is a diagram of a network that may incorporate controllers connected together in a serial like fashion or daisy chain with cables going from one network switch to another network switch.

In FIG. 6, a network may incorporate, for instance, a number of devices 46, such as controllers connected together in a serial like fashion or daisy chain with cable 47 going from one network switch 45 to another network switch 45.

Available IP protocols that may be supported are BACnet™ IP, LON™ IP (Echelon™), MODbus™ IP, and Niagara Fox™. The system may also be capable with a future IP protocol. The system may have a secure network through Fox. A Fox network may incorporate the only secure protocol in the HVAC industry.

Figure 7:
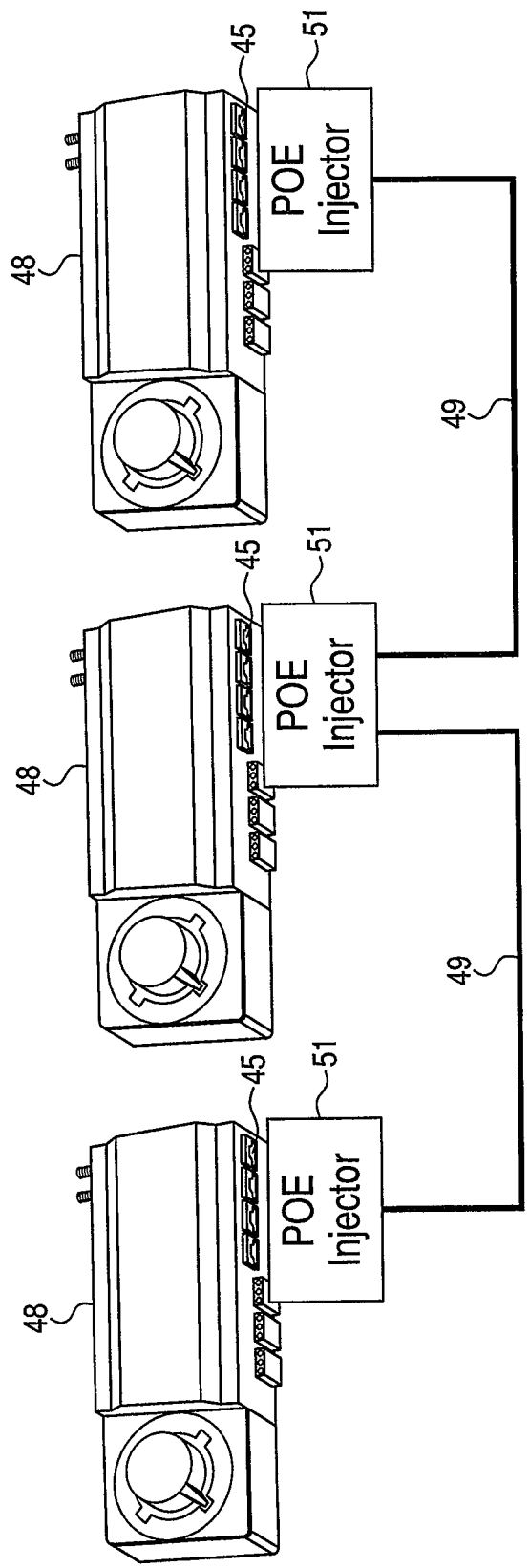
FIG. 7 is a diagram of devices connected in a serial fashion or daisy chain with power-over-Ethernet (POE) injectors on connecting cables.
Figure 8:
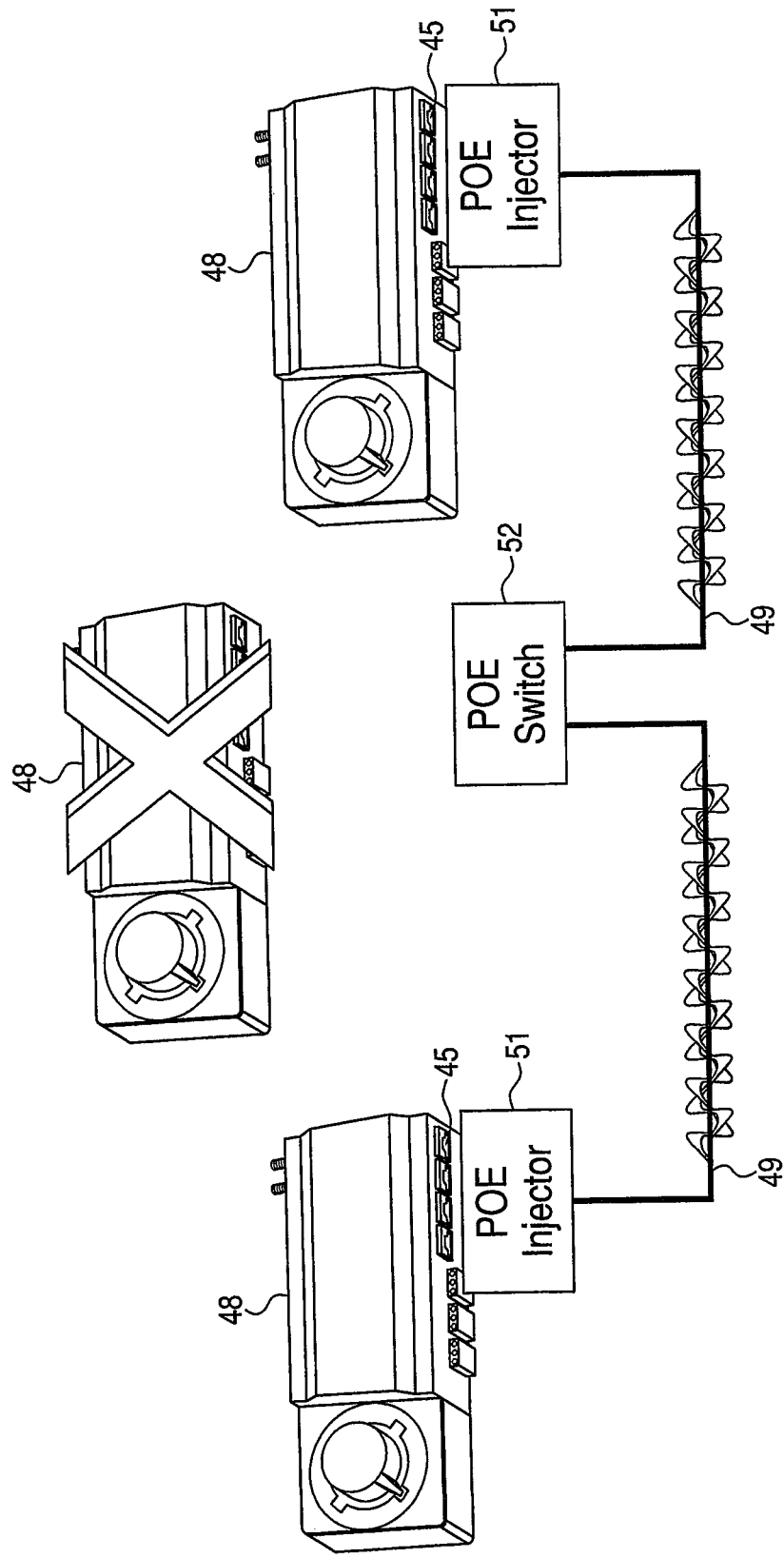
FIG. 8 is a diagram of devices having multi-point POE injectors with a POE switch that may maintain communications even if a device losses power.

The system may incorporate a failsafe network POE switch with a multi-point POE injection. Devices 48, such as controller, may be connected in a serial fashion or daisy chain with power-over-Ethernet injectors 51 on cables 49, in FIG. 7. With a multi-point POE injectioners 51, a switch 52 may maintain communications even if a device losses power as indicated in FIG. 8.

Figure 9:
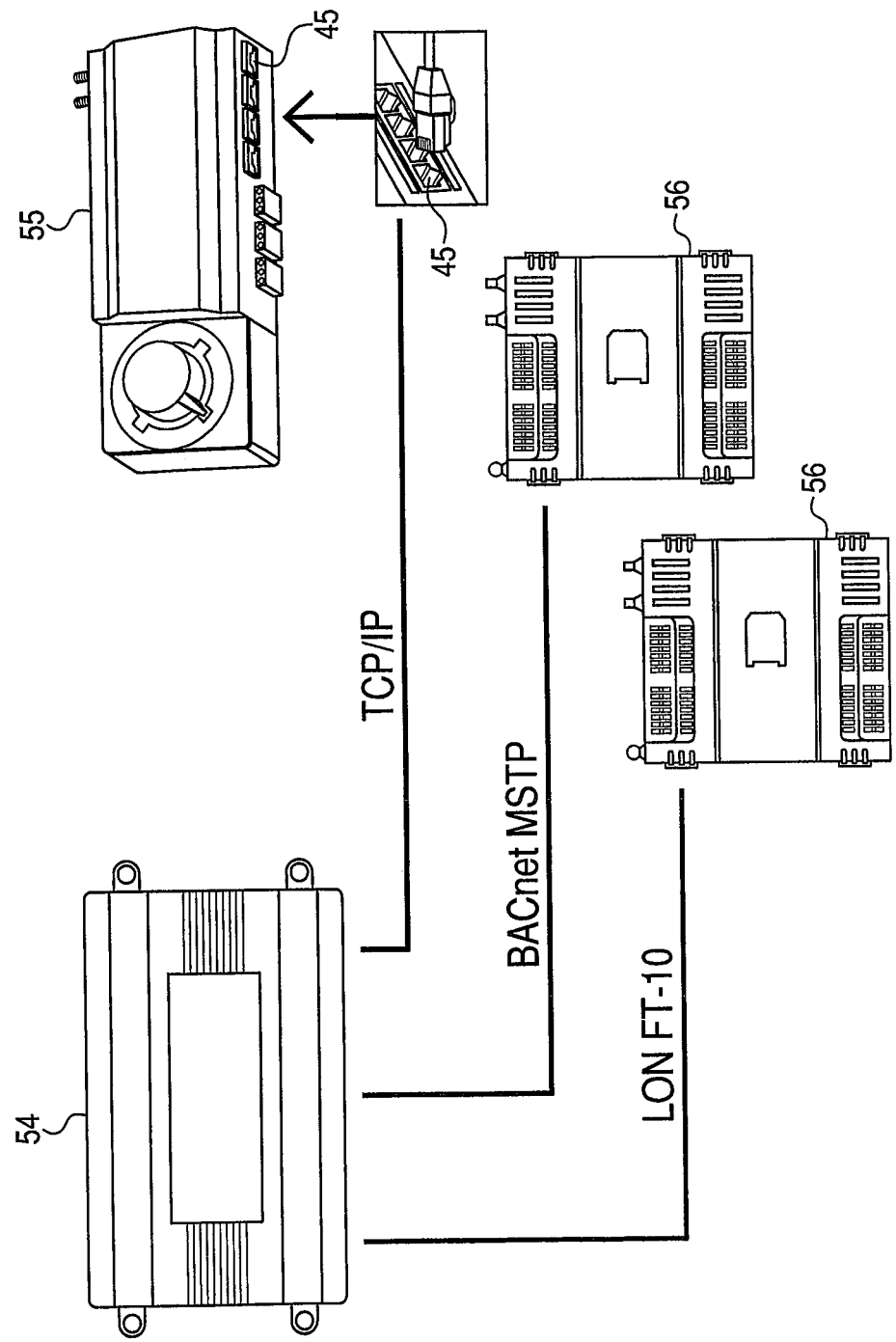
FIG. 9 is a diagram showing legacy protocols that may be, be supported by using a standard JACE.

Legacy protocols, such as Lon and BACnet MSTP, may be supported by using a standard JACE. A JACE 54 may support a TCP/IP protocol for a connection to device 55, a BACnet MSTP protocol for a connection to device 56 and a LON FT-10 protocol to device 57, as illustrated in FIG. 9. Devices 55, 56 and 57 may be controllers of one sort or another, or be other kinds of devices.

Figure 10:
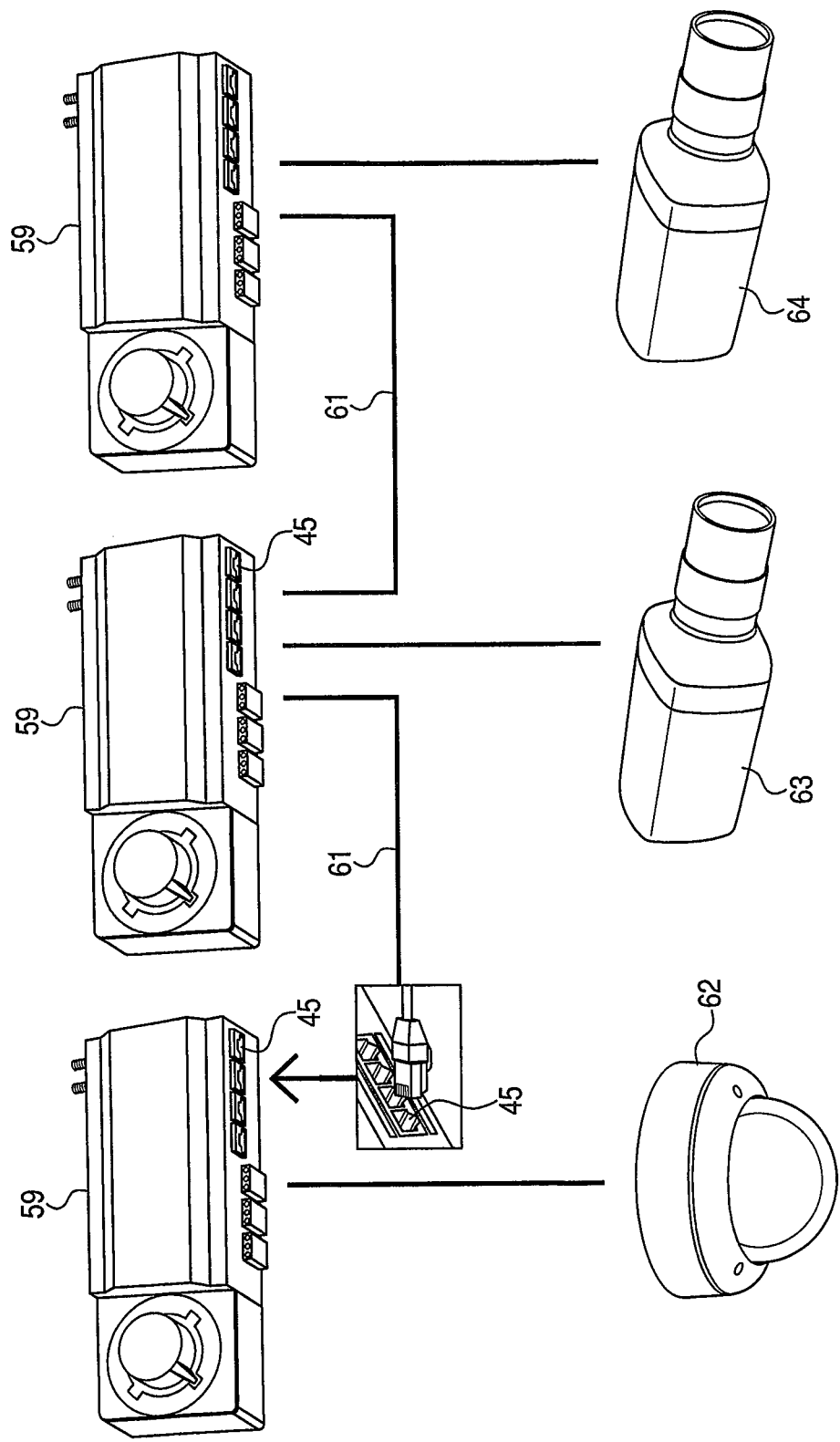
FIG. 10 is a diagram of controllers interconnected with cables in a serial fashion via network switches with each controller individually connected to a surveillance component.

System IP video may connect directly to an available system BLAN. FIG. 10 is a diagram of controllers 59 interconnected with cables 61 in a serial fashion via network switches. Each controller 59 may be individually connected to a surveillance video component 62, camera 63 and camera 64, respectively.

Figure 11:
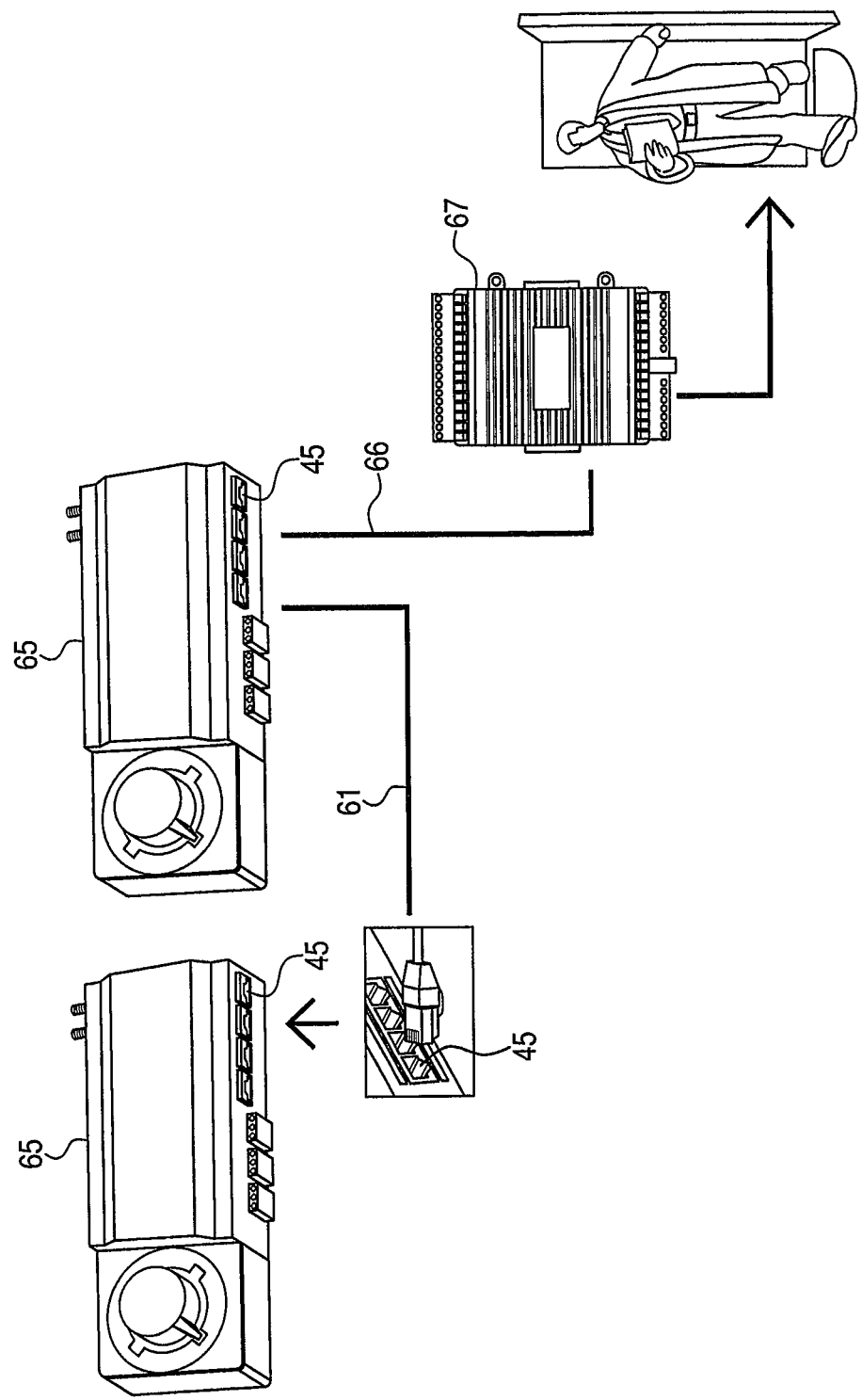
FIG. 11 is a diagram showing devices connected to each other via a cable and network switches to form a building local area network (BLAN) with one or more door control modules connected to the BLAN.
Figure 12:
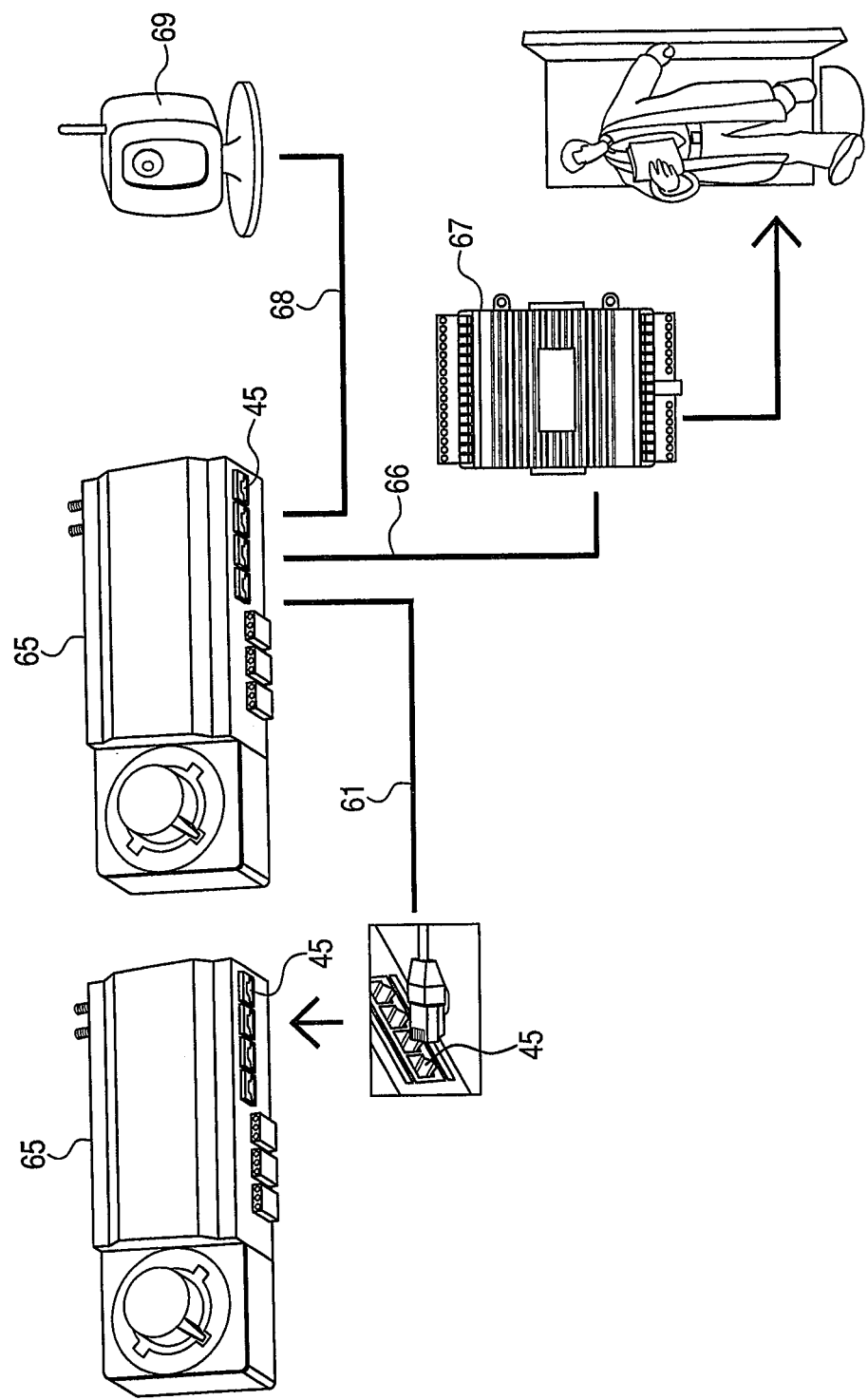
FIG. 12 is a diagram like that of FIG. 11 having a video module added to the BLAN.

System access control may incorporate an IP based door control module. Door modules may connect directly to the available system BLAN. FIG. 11 is a diagram showing devices 65 connected to each other via a cable 61 and network switches 45 to form a BLAN. One or more door control modules 67 may be connected to the BLAN via a cable 66 to network switch 45 of device 65. System access control may have IP video on every door. There may be a full REX replacement with video recording. FIG. 12 is a diagram showing a BLAN of devices 65 and cable 61, and a door module 67, with an added video module 69 connected to the BLAN via a cable 68 and network switch 45.

Figure 13:
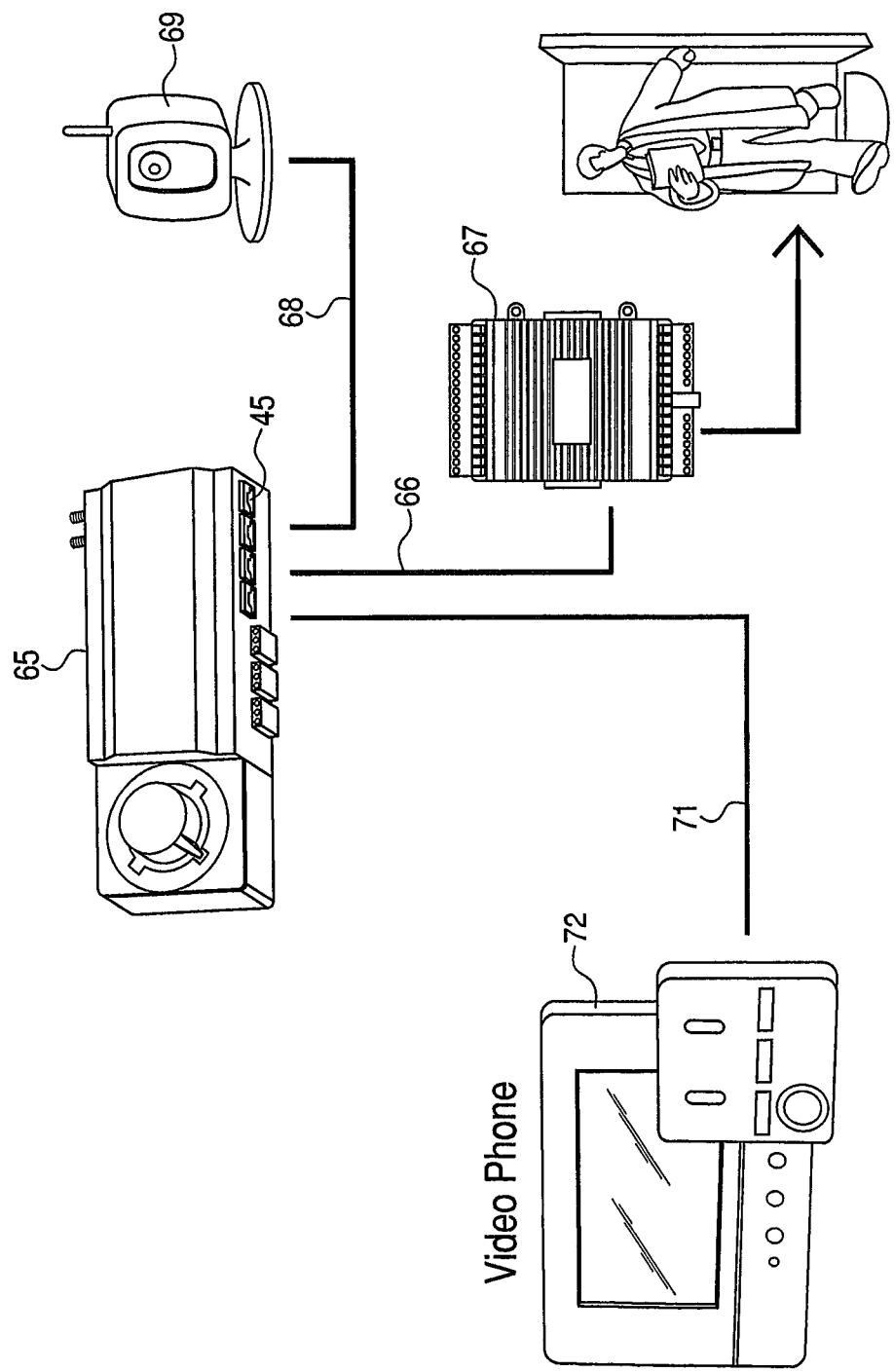
FIG. 13 is a diagram like that of FIG. 12 having a video phone added to the BLAN.

There may be a system intercom, VoIP and or a video phone. Intercom functionality may be at every door. One may request door access from security or may call for help. FIG. 13 is a diagram of device 65, door control module 67 and video 69. Added to the diagram may be a video phone 72 connected to device 65 via a cable 71 and network switch 45.

There may be system IP based wall modules that are wired or wireless with full graphic capability. It may be browser based wall module capable. One may play back video instantly.

Figure 14:
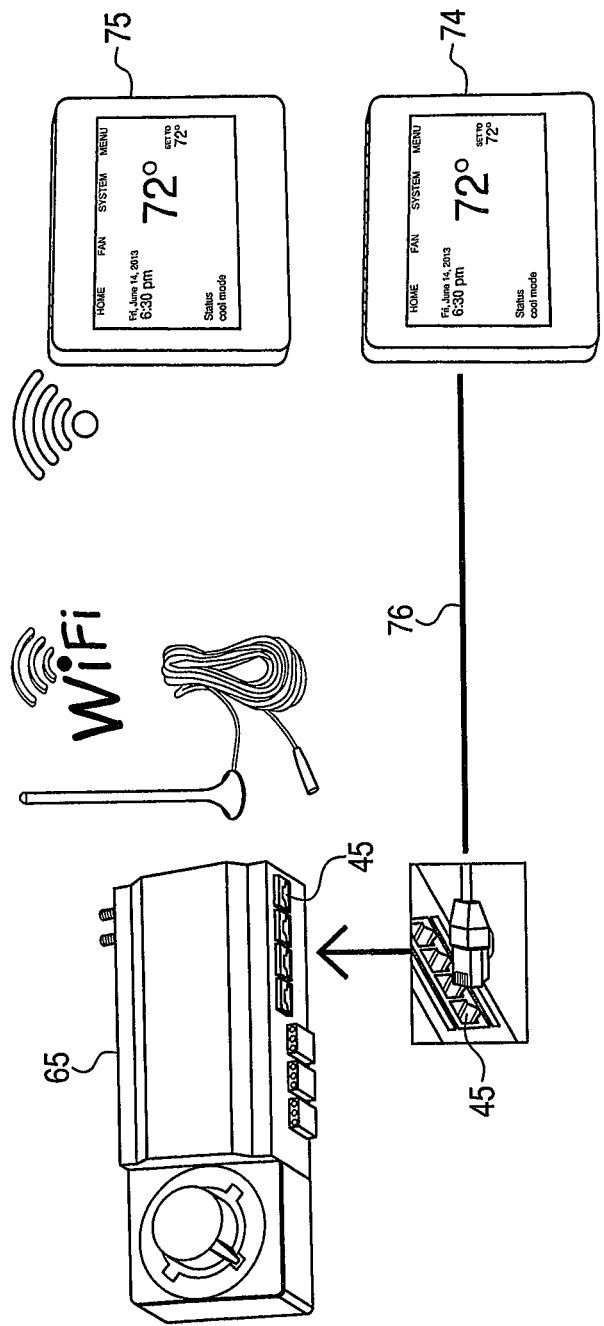
FIG. 14 is a diagram of a device having an IP based wall module connected via a cable and network switch, and having a wall module connected in a wireless fashion.

FIG. 14 is a diagram of device 65 having an IP based wall module 74 connected via a cable 76 and network switch 45 to device 65. Wall module 75 may be connected in a wireless fashion to device 65 via a WiFi apparatus 77.

Figure 15:
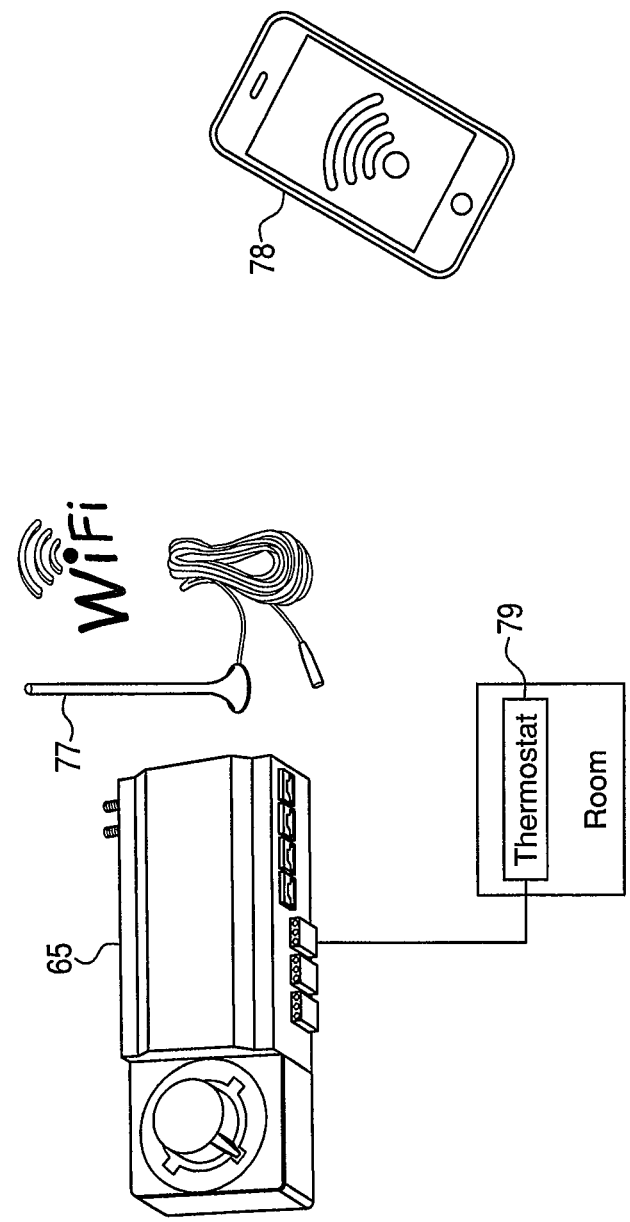
FIG. 15 is a diagram of a phone connected to a device via a WiFi apparatus for controlling a room temperature thermostat.

There may be system individual room control. One may control one' own comfort by setting one's room temp directly through one's system phone app or one's PC. FIG. 15 is a diagram of a phone 78 connected to device 65 via WiFi apparatus 77 for controlling a room temperature thermostat 79 by device 65.

Figure 16:
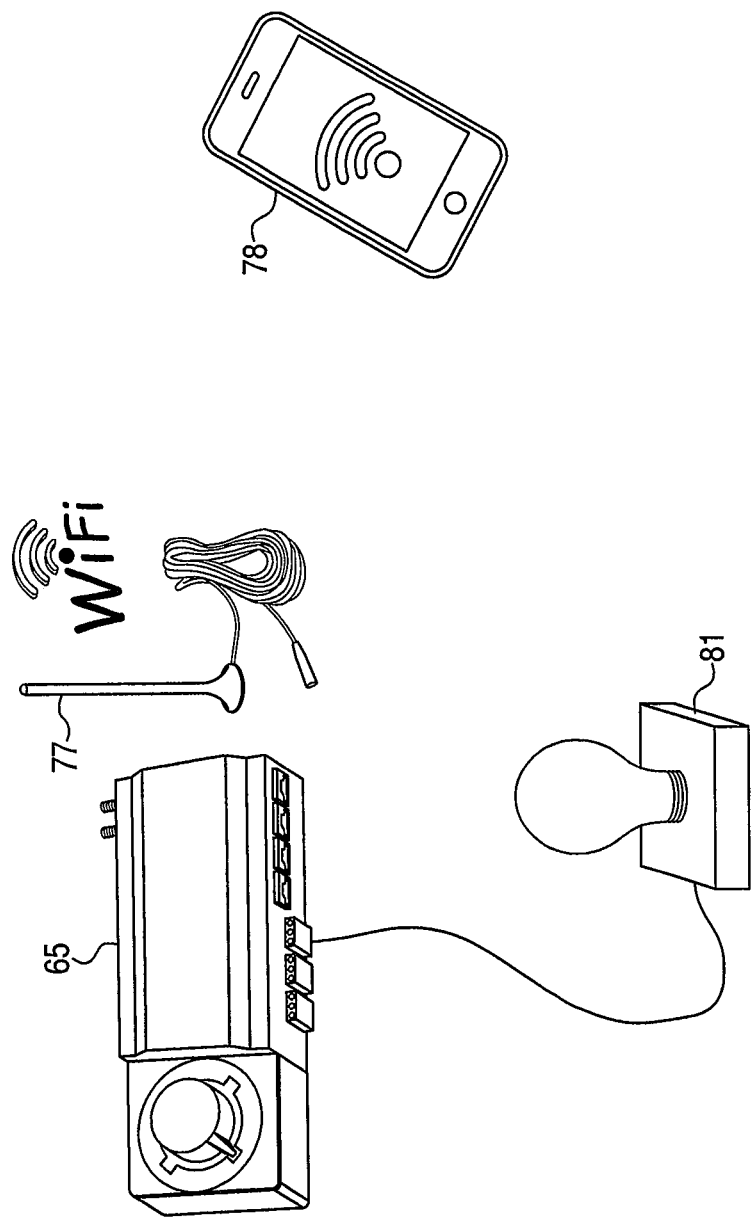
FIG. 16 is a diagram that illustrates lighting level control for a room with phone connected to a device via a WiFi apparatus.

For system individual room control, one may easily modify one's lighting level directly through one's present system phone app or one's PC. FIG. 16 is a diagram that illustrates lighting level control for a room with phone 78 connected to device 65 via WiFi apparatus 77 for controlling room lighting 81 by device 65.

A system individual room control may use a system energy optimizer that automatically adjusts temperature and lighting levels as shown in FIG. 15 and FIG. 16 based on occupancy (e.g., phone location).

Figure 17:
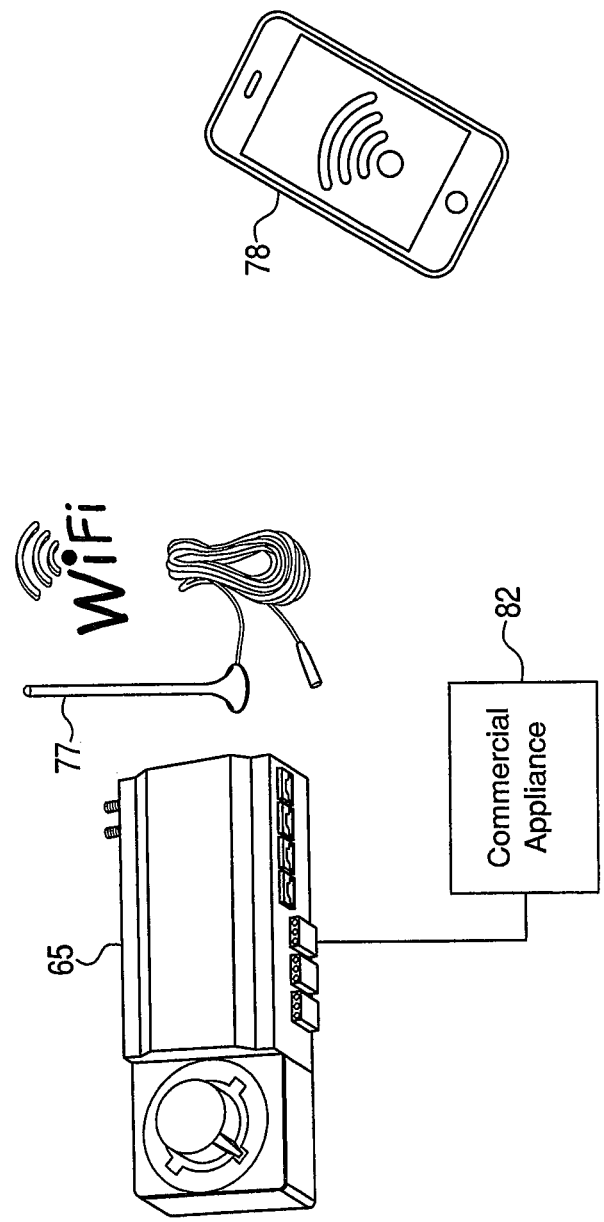
FIG. 17 is a diagram that illustrates control of a commercial appliance with phone connected to device via a WiFi apparatus.

A system light commercial appliance may be configured directly through one's system app or laptop. FIG. 17 is a diagram that illustrates control of a commercial appliance 82 with phone 78 connected to device 65 via WiFi apparatus 77 for controlling commercial appliance 82.

System controllers and appliances may automatically communicate directly to the system mission critical cloud WiFi.

Figure 18:
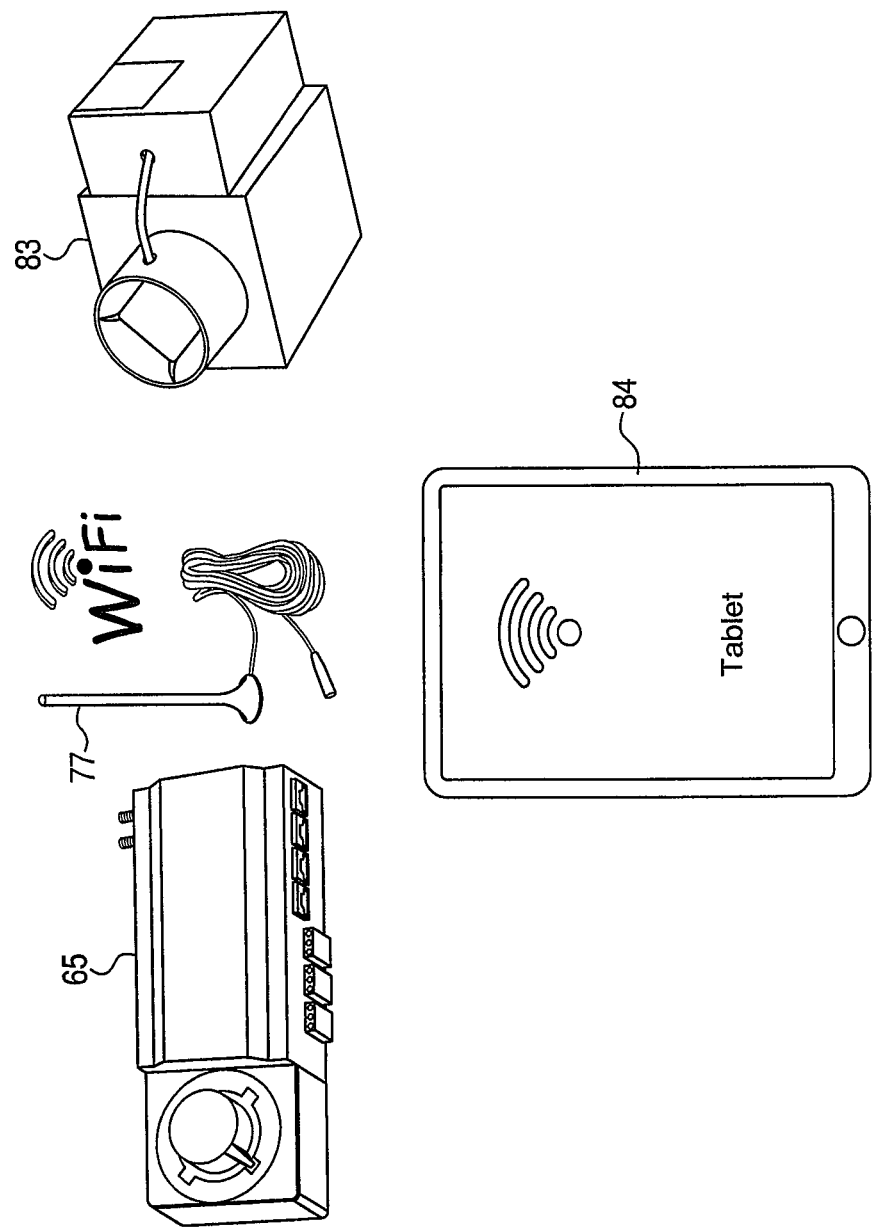
FIG. 18 is a diagram that illustrates commission and balance of a mechanism via a tablet and a WiFi apparatus.

There may be system smart device commissioning. Commission and balance can be had directly with a tablet or phone. FIG. 18 is a diagram that illustrates commission and balance of a mechanism 83 via a tablet 84, WiFi apparatus 77 and device 65.

Figure 19:
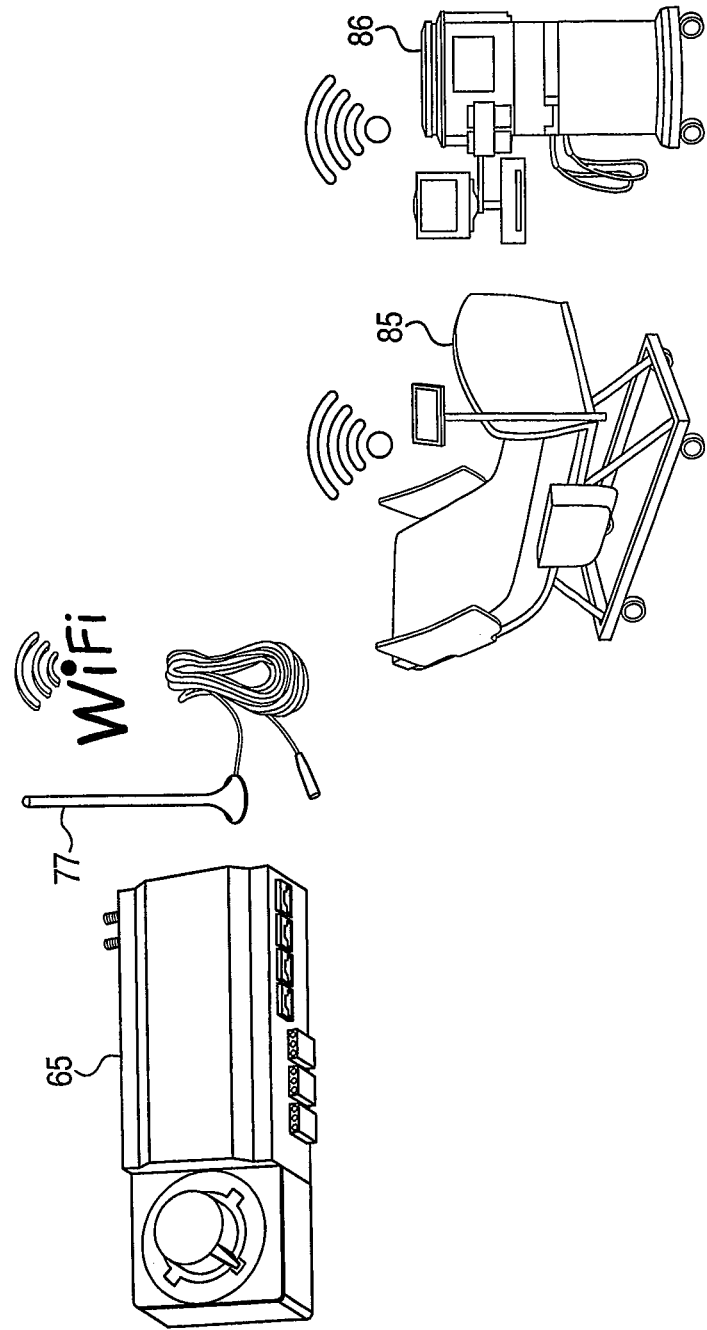
FIG. 19 is a diagram that shows equipment pieces that provide WiFi signals via WiFi apparatus to device for locating the pieces.

There may be system asset tagging and tracking that uses a system WiFi network to triangulate a location of expensive equipment. FIG. 19 is a diagram that shows equipment pieces 85 and 86 that provide WiFi signals via WiFi apparatus 77 to device 65 for locating pieces 85 and 86.

There may be system access points or hot spots that may use a system network for wireless access solution of retail or schools.

Figure 20:
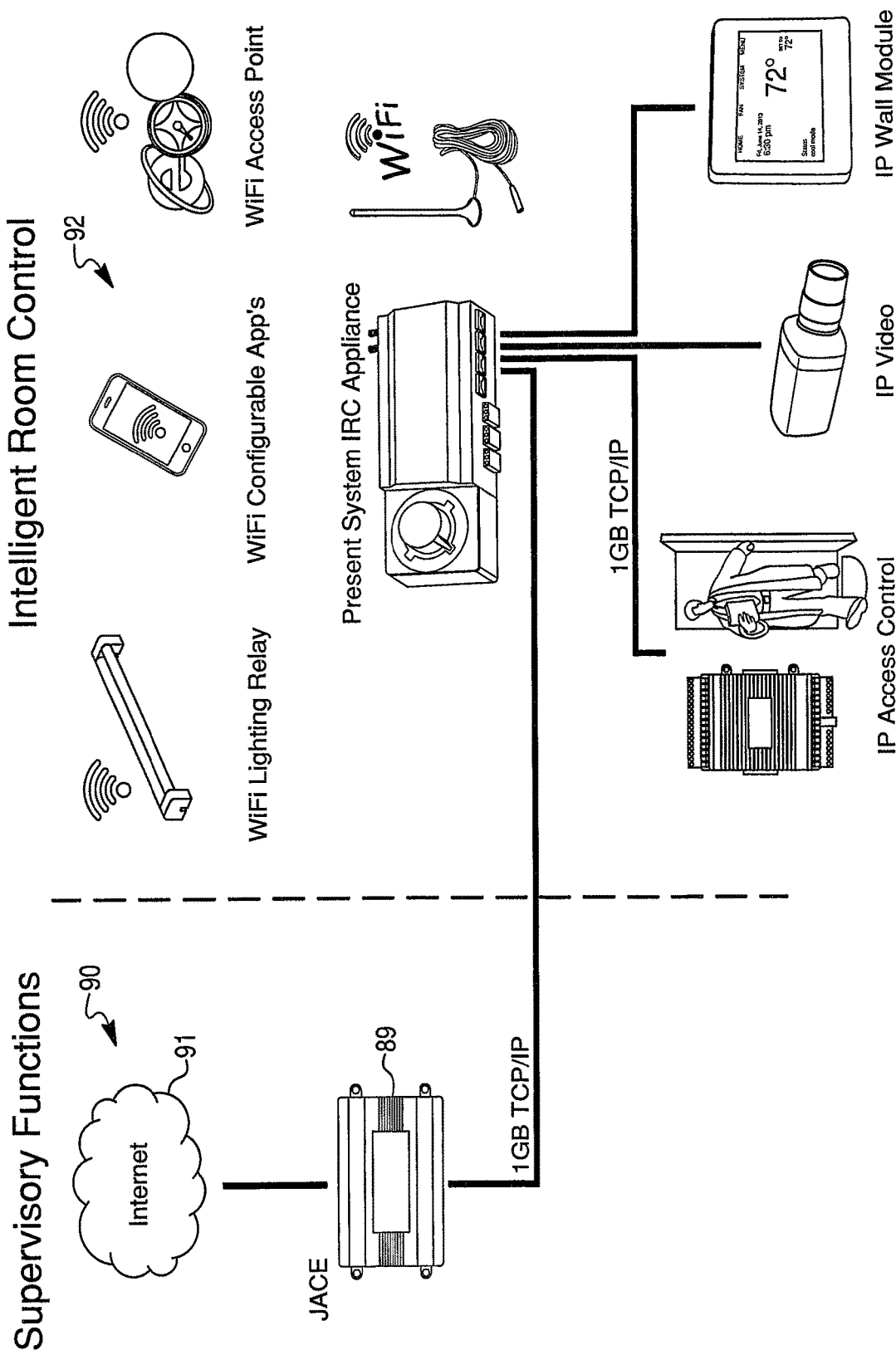
FIG. 20 is a diagram of a system that may exhibit a standalone architecture having a portion for supervisory functions involving a JACE connected to an internet and connected to a portion for intelligent room control.
Figure 21:
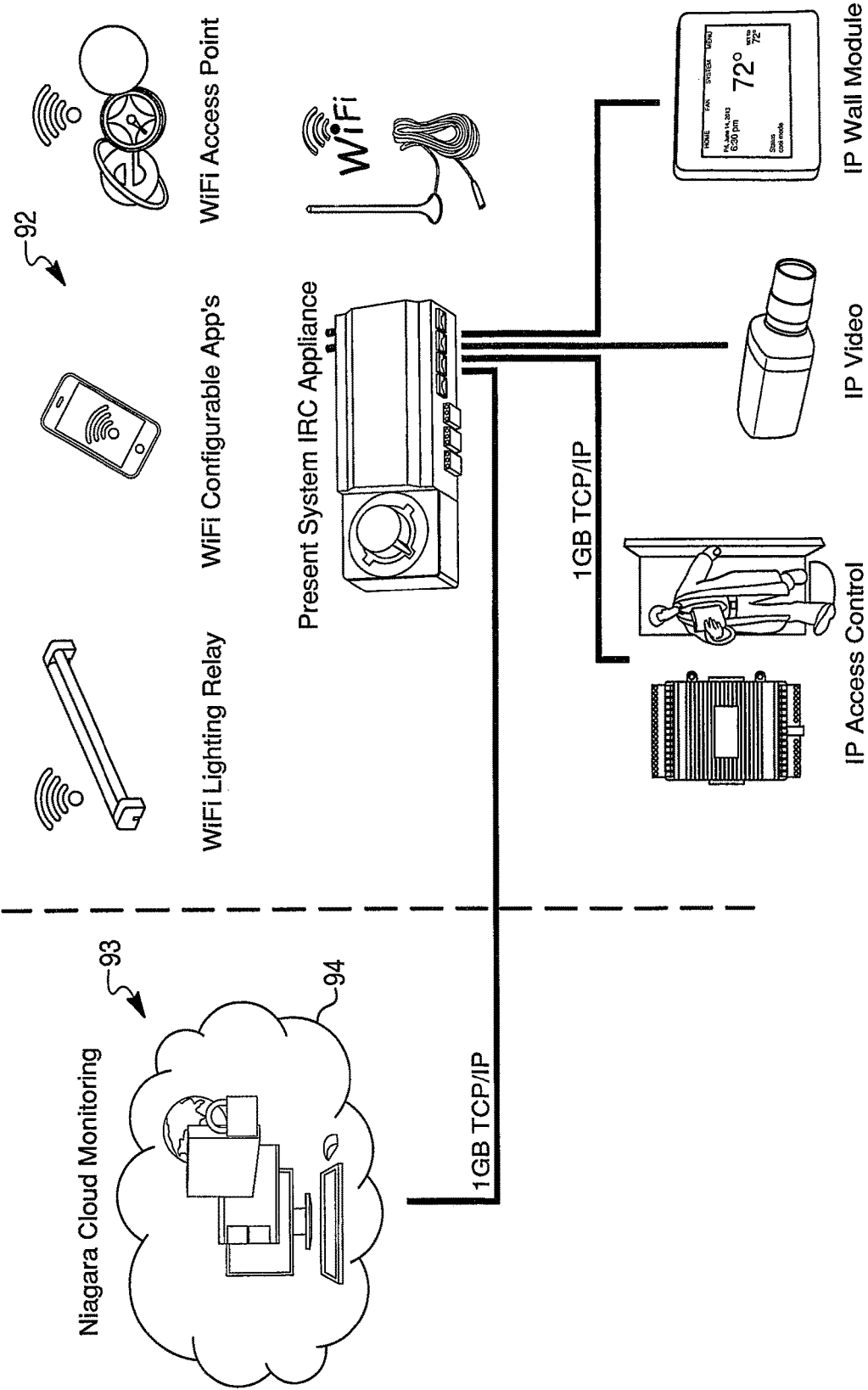
FIG. 21 is a diagram of a system that may exhibit a cloud architecture having a portion for supervisory functions involving cloud monitoring and portion for intelligent room control.

In FIG. 20, a system may exhibit a standalone architecture having a portion 90 for supervisory functions involving a JACE 89 connected to an internet 91 and connected to a portion 92 for intelligent room control. In FIG. 21, a system may exhibit a cloud architecture having a portion 93 for supervisory functions involving Niagara cloud monitoring 94 and portion 92 for intelligent room control.

Figure 22:
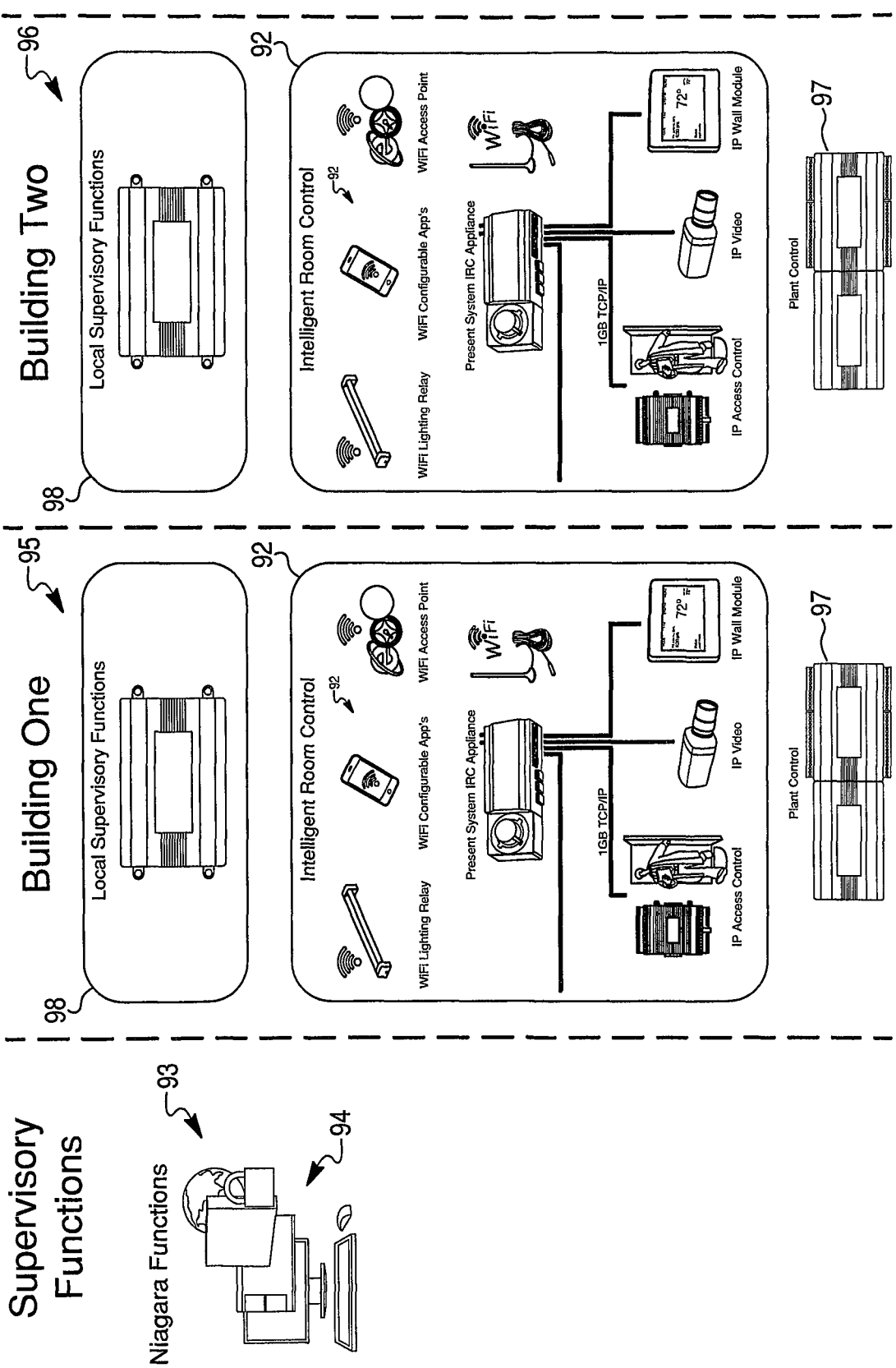
FIG. 22 is a diagram of a system that may exhibit a multi-building architecture having a portion for supervisory functions involving a supervisor and portions for buildings.

FIG. 22 is a diagram of a system that may exhibit a multi-building architecture having a portion 93 for supervisory functions involving a Niagara supervisor and portions 95 and 96 for buildings. For example, there may be a building one 95 having local supervisory functions 98 connected to intelligent room control 92 and/or plant control 97. There may be also a building two 96 having local supervisory functions 98, intelligent room control 92 and/or plant control 97. There may be additional buildings with configurations similar to those of buildings one and two.

Figure 23:
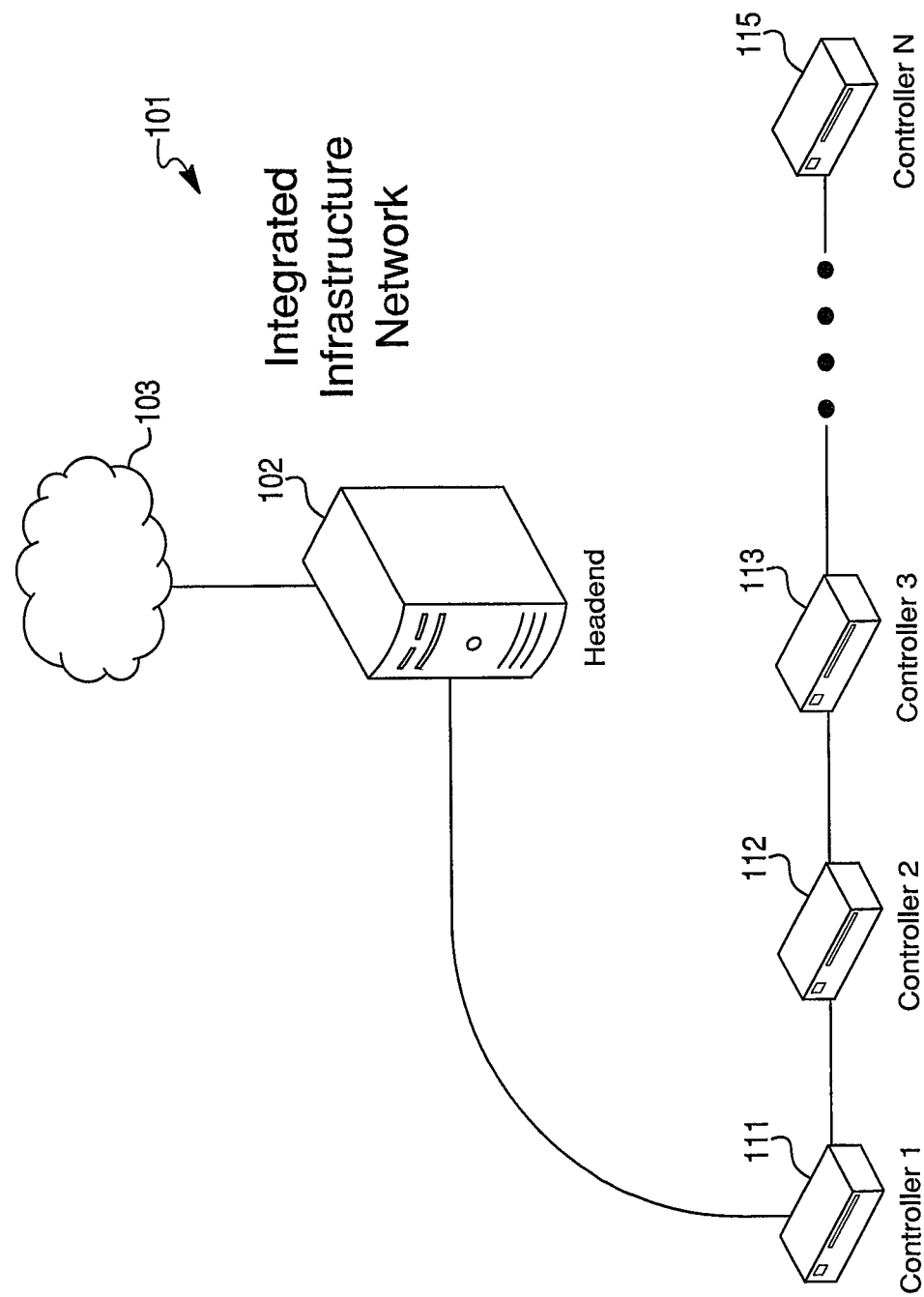
FIG. 23 is a diagram of a network that may be an integrated infrastructure structure.

A network may be an integrated infrastructure structure as shown in FIG. 23. A headend 102 may be connected to a cloud 103. A controller one 111 may be connected to headend 102. A controller two 112 may be connected to controller one 111. A controller three 113 may be connected to controller two 112. Additional controllers may be connected in a serial fashion through a controller N 115 where N may be a positive whole number.

Figure 24:
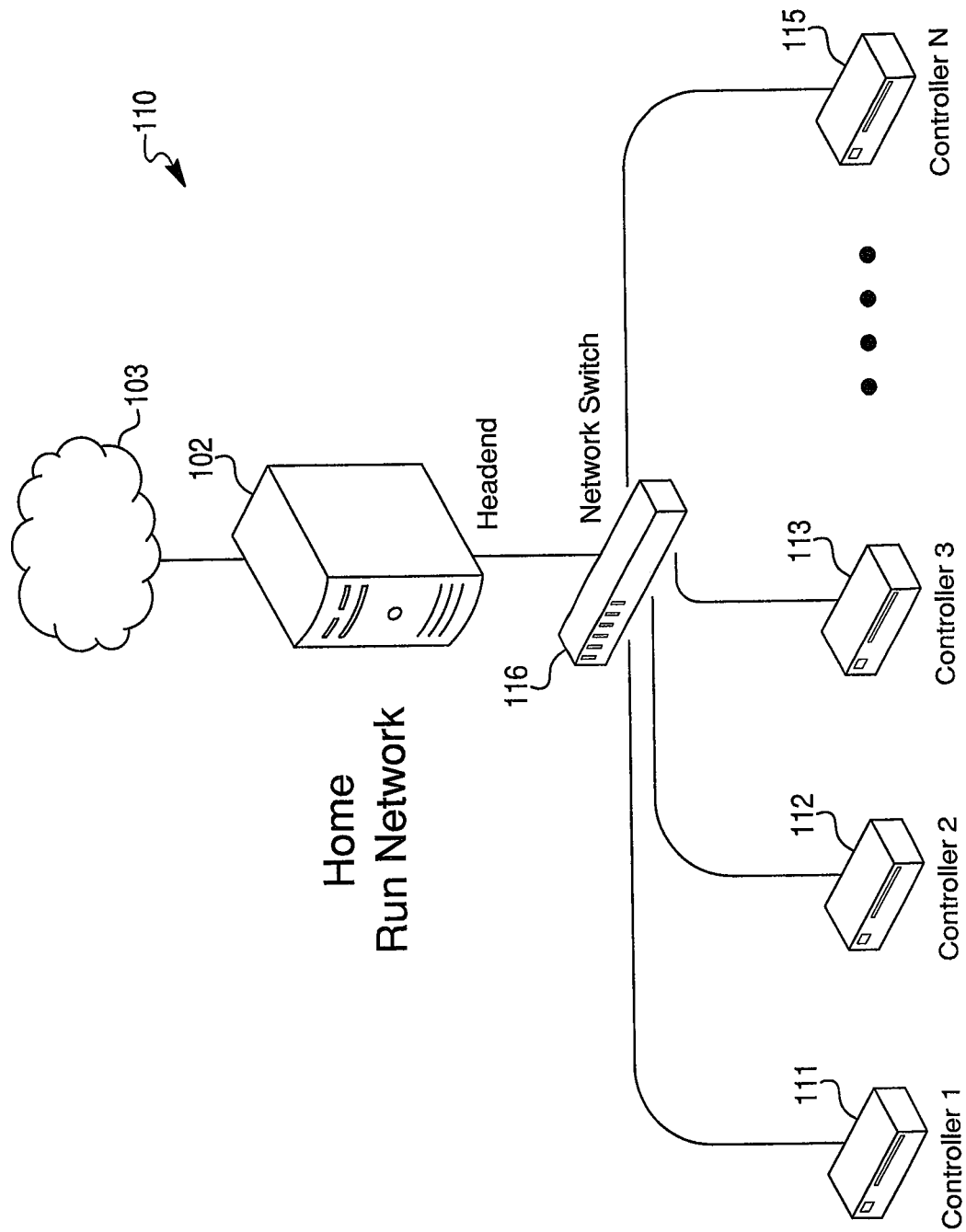
FIG. 24 is a diagram of a network that may be a home run network.

A network 110 may be a home run network as shown in FIG. 24. Headend 102 may be connected to cloud 103. A network switch 116 may be connected to headend 102. Controller one 111 may be connected to a network switch 116. Controller two 112 may also be connected to network switch 116. Additional controllers 113 through 115 may be connected to network switch 116.

To recap, a system for power over network switching may incorporate two or more controllers. Each controller of the two or more controllers may incorporate a multi-port Ethernet switch. A first port of the Ethernet switch may be for power sourcing equipment and a second port of the Ethernet may be for a powered device. The two or more controllers may be connected in a daisy chain fashion with a power over Ethernet (POE) cable connected from a first port of an Ethernet switch of one controller to a second port of another controller, respectively.

The two or more controllers may have a normal operating mode or an input power failure mode.

In the normal operating mode, each controller of the two or more controllers may be powered at a voltage input of the controller apart from a POE cable. In the input power failure mode, there may be an absence of power to the voltage input of at least one controller, and the at least one controller may be powered by a POE cable having one end connected to the second port of an Ethernet switch of the at least one controller and having another end connected to a first port of a Ethernet switch having power of another controller.

The POE cable may convey data signals. An Ethernet switch may incorporate a third port that is a power sourcing equipment port.

A controller of the two or more controllers may be connected to an HVAC system. The third port may provide power to a peripheral device of an HVAC system.

A network power switching arrangement may incorporate a plurality of controllers. Each controller may incorporate a net switch having a power sourcing equipment port and a powered device port. A cable may connect a power sourcing equipment port of a net switch of one controller to a powered device port of a net switch of another controller. If the net switch of the other controller loses power, current may be provided by the power sourcing equipment port of the net switch of the one controller via the cable to the powered device port of the net switch of the other controller.

The cable may be a power over Ethernet cable. The net switch may be an Ethernet switch.

The one controller may be a first controller. The other controller may be a second controller. The cable may be a first cable. A second cable may connect a power sourcing equipment port of a net switch of a second controller to a powered device port of a net switch of a third controller.

The plurality of controllers may incorporate N controllers and at least N−1 cables. An N−3 cable may connect a power sourcing equipment port of a net switch the fourth (N−4) controller to a powered device port of a net switch of an N−5 controller. An N−4 cable may connect a power sourcing equipment port of a net switch of the N−5 controller to a powered device port of a net switch of an N−6 controller. N may be a positive whole number.

The connecting of a cable from a power sourcing equipment port of a net switch of an N−X+1 controller to a powered device port of a net switch of a N−X controller in a daisy chain fashion may continue until X=N. X may be a positive whole number.

An approach of implementing a failsafe network switch of a controller, may incorporate connecting, with a cable, a first port for a network switch of one controller to a second port for a network switch of another controller. A first port for a network switch of a controller may be a power sourcing equipment port. A second port for a network switch of a controller may be a powered device port. A controller may incorporate a power input terminal. If power is present at the power input terminal of the network switch of one controller and power is absent at the power input terminal of another controller, then power may be provided via the cable from the power sourcing equipment port for a network switch of the one controller to a powered device port for a network switch of the other controller. An additional one or more network switches of one or more controllers may be daisy chained in connection of power sourcing equipment ports and powered device ports with a cable between every two of network switches so as to provide power from a network switch to one or more network switches without power.

The cable may be a power over Ethernet cable that can convey power and communication signals between network switches. Each network switch may be a power over Ethernet switch.

The controllers may be heating, ventilation and air conditioning (HVAC) controllers.

The approach may further incorporate creating a building local area network (BLAN) from the controllers.

Power may become present at one or more auxiliary ports for the network switch of the controller having the absence of power at the power input terminal, upon a conveyance of power to the second terminal for the network switch of the controller having the absence of power at the power input terminal.

The one or more auxiliary ports may provide power for one or more items selected from a group incorporating IP video, IP door control modules, IP intercoms, and IP wall modules.

Each network switch may be integrated with a controller.

Controllers may be added piece-meal in the future without impairing a present usage of the existing controllers.

The controllers may be building management system (BMS) controllers.

Any publication or patent document noted herein is hereby incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A system for power over network switching comprising:
   two or more heating, ventilation, and air conditioning (HVAC) controllers; and
   wherein:
   each HVAC controller of the two or more HVAC controllers comprises a multi-port Ethernet switch;
   a first port of the Ethernet switch is for power sourcing equipment and a second port of the Ethernet switch is for a powered device; and
   the two or more HVAC controllers are connected in a daisy chain fashion with a power over Ethernet (POE) cable connected from a first port of an Ethernet switch of one HVAC controller to a second port of another HVAC controller, respectively, creating a building local area network (BLAN) from HVAC controllers,
   wherein the BLAN is secured by incorporating a Fox protocol,
   wherein the two or more HVAC controllers are configured and adapted to maintain communication among remaining HVAC controllers of the two or more controllers when one controller of the two or more HVAC controllers loses power, and
   wherein at least one of the two or more HVAC controller is connected to an internet via a Java Application Control Engine (JACE™).

2. The system of claim 1, wherein the two or more HVAC controllers have a normal operating mode or an input power failure mode.

3. The system of claim 2, wherein:
in the normal operating mode, each HVAC controller of the two or more HVAC controllers is powered at a voltage input of the HVAC controller apart from a POE cable; and
in the input power failure mode, there is an absence of power to the voltage input of at least one HVAC controller, and the at least one HVAC controller can be powered by a POE cable having one end connected to the second port of an Ethernet switch of the at least one HVAC controller and having another end connected to a first port of a Ethernet switch having power of another controller.

4. The system of claim 3, wherein the POE cable can convey data signals.

5. The system of claim 4, wherein an Ethernet switch comprises a third port that is a power sourcing equipment port.

6. The system of claim 5, wherein:
an HVAC controller of the two or more HVAC controllers is connected to an HVAC system; and
the third port can provide power to a peripheral device of an HVAC system.

7. A network power switching arrangement comprising:
a plurality of heating, ventilation, and air conditioning (HVAC) controllers; and
wherein:
each HVAC controller comprises a net switch having a power sourcing equipment port and a powered device port;
a cable connects a power sourcing equipment port of a net switch of one HVAC controller to a powered device port of a net switch of another HVAC controller,
wherein the network is a building local area network (BLAN),
wherein the BLAN is secured by incorporating a Fox protocol; and
if the net switch of the other HVAC controller loses power, current can be provided by the power sourcing equipment port of the net switch of one HVAC controller via the cable to the powered device port of the net switch of another HVAC controller,
wherein at least one of the two or more HVAC controller is connected to an internet via a Java Application Control Engine (JACE™).

8. The network power switching arrangement of claim 7, wherein:
the cable is a power over Ethernet cable; and
the net switch is an Ethernet switch.

9. The network power switching arrangement of claim 8, wherein:
the one HVAC controller is a first controller;
the other HVAC controller is a second controller;
the cable is a first cable; and
a second cable connects a power sourcing equipment port of a net switch of a second controller to a powered device port of a net switch of a third controller.

10. The network power switching arrangement of claim 9, wherein:
the plurality of HVAC controllers comprises N controllers and at least N−1 cables;
an N−3 cable connects a power sourcing equipment port of a net switch a fourth (N−4) controller to a powered device port of a net switch of an N−5 controller;
an N−4 cable connects a power sourcing equipment port of a net switch of the N−5 controller to a powered device port of a net switch of an N−6 controller; and
N is a positive whole number.

11. The network power switching arrangement of claim 10, wherein the connecting of a cable from a power sourcing equipment port of a net switch of an N−X+1 controller to a powered device port of a net switch of an N−X controller in a daisy chain fashion continues until X=N; and
X is a positive whole number.

12. A method of implementing a failsafe network switch of a heating, ventilation, and air conditioning (HVAC) controller, comprising:
connecting, with a cable, a first port for a network switch of one HVAC controller to a second port for a network switch of another HVAC controller creating a building local area network (BLAN) from HVAC controllers,
wherein the BLAN is secured by incorporating a Fox protocol; and
wherein:
a first port for a network switch of an HVAC controller is a power sourcing equipment port;
a second port for a network switch of an HVAC controller is a powered device port;
an HVAC controller comprises a power input terminal;
if power is present at the power input terminal of the network switch of one HVAC controller and power is absent at the power input terminal of another HVAC controller, then power can be provided via the cable from the power sourcing equipment port for a network switch of the one HVAC controller to a powered device port for a network switch of the another HVAC controller having an absence of power at the power input terminal; and
an additional one or more network switches of one or more HVAC controllers can be daisy chained in connection of power sourcing equipment ports and powered device ports with a cable between every two of network switches so as to provide power from a network switch to one or more network switches without power,
wherein at least one of the two or more HVAC controller is connected to an internet via a Java Application Control Engine (JACE™).

13. The method of claim 12, wherein:
the cable is a power over Ethernet cable that can convey power and communication signals between network switches; and
each network switch is a power over Ethernet switch.

14. The method of claim 13, wherein power becomes present at one or more auxiliary ports for the network switch of the HVAC controller having the absence of power at the power input terminal, upon a conveyance of power to a second terminal for the network switch of the HVAC controller having the absence of power at the power input terminal.

15. The method of 14, wherein the one or more auxiliary ports can provide power for one or more items selected from a group comprising IP video, IP door control modules, IP intercoms, and IP wall modules.

16. The method of claim 13, wherein each network switch is integrated with an HVAC controller.

17. The method of claim 13, wherein one or more HVAC controllers can be added piece-meal at a future time without impairing a present usage of existing HVAC controllers.

18. The method of claim 13, wherein the one or more HVAC controllers are building management system (BMS) controllers.

\* \* \* \* \*